(12) United States Patent
Rafique

(10) Patent No.: US 11,411,624 B2
(45) Date of Patent: Aug. 9, 2022

(54) SYSTEMS AND METHODS FOR CORRECTION OF BEAM DIRECTION DUE TO SELF-COUPLING

(71) Applicant: Telefonaktiebolaget LM Ericsson (PUBL), Stockholm (SE)

(72) Inventor: Raihan Rafique, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/279,714

(22) PCT Filed: Sep. 28, 2018

(86) PCT No.: PCT/EP2018/076476
§ 371 (c)(1),
(2) Date: Mar. 25, 2021

(87) PCT Pub. No.: WO2020/064128
PCT Pub. Date: Apr. 2, 2020

(65) Prior Publication Data
US 2021/0399774 A1 Dec. 23, 2021

(51) Int. Cl.
*H04B 7/0456* (2017.01)
*H04B 7/06* (2006.01)
*H04B 7/10* (2017.01)

(52) U.S. Cl.
CPC ........ *H04B 7/0469* (2013.01); *H04B 7/0617* (2013.01); *H04B 7/10* (2013.01)

(58) Field of Classification Search
CPC ....... H04B 7/0469; H04B 7/10; H04B 7/0617
See application file for complete search history.

(56) References Cited

U.S. PATENT DOCUMENTS 5,574,967 A * 11/1996 Dent ..................... H03F 1/3229
455/12.1
5,822,310 A * 10/1998 Chennakeshu ........... H04L 1/08
455/10

(Continued)

FOREIGN PATENT DOCUMENTS

CA 2190258 A1 * 12/1995 ............. H01Q 3/267
CA 2190258 A1 * 9/2003 ........... H04L 5/1461

(Continued)

OTHER PUBLICATIONS

L. Zhang et al., "Layered-Division-Multiplexing: Theory and Practice," in IEEE Transactions on Broadcasting, vol. 62, No. 1, pp. 216-232, Mar. 2016, doi: 10.1109/TBC.2015.2505408. (Year: 2015).*

(Continued)

*Primary Examiner* — Berhanu Tadese
(74) *Attorney, Agent, or Firm* — Baker Botts, LLP

(57) ABSTRACT

Systems and methods for correcting beam weighting factors for a radio system include obtaining measurements of cross-polarization transfer functions between respective pairs of dual-polarized antenna elements in the antenna system and computing coupling values for the respective pairs and reflection coefficient values by numerically solving a system of equations in which a subset of the coupling values are set to zero and the measurements of the cross-polarization transfer functions of the respective pairs are a function of the coupling values for the respective pairs of the dual-polarized antenna elements and the reflection coefficient values. Correction factors are computed for the antenna elements based on the computed coupling values and reflection coefficients. Based on the respective correction factors, beam weighting factors are calculated for at least some of the antenna elements for a desired beam direction.

18 Claims, 12 Drawing Sheets

(56) References Cited

U.S. PATENT DOCUMENTS

| | | | | |
|---|---|---|---|---|
| 5,850,283 | A * | 12/1998 | Zheng | G01M 11/37 |
| | | | | 356/73.1 |
| 6,339,399 | B1 * | 1/2002 | Andersson | H01Q 3/267 |
| | | | | 342/174 |
| 6,384,782 | B2 * | 5/2002 | Erikmats | H01Q 3/2605 |
| | | | | 342/379 |
| 6,466,160 | B2 * | 10/2002 | Rexberg | H01Q 3/2605 |
| | | | | 342/174 |
| 7,587,219 | B2 * | 9/2009 | Bottomley | H04W 52/322 |
| | | | | 455/452.2 |
| 8,200,286 | B2 * | 6/2012 | Molnar | H01Q 1/246 |
| | | | | 455/562.1 |
| 8,634,874 | B2 * | 1/2014 | Molnar | H04W 72/046 |
| | | | | 455/562.1 |
| 9,397,383 | B2 * | 7/2016 | Mariotti | H01Q 1/005 |
| 10,014,920 | B2 * | 7/2018 | Hammarwall | H04W 72/042 |
| 2003/0179137 | A1 * | 9/2003 | White | H01Q 1/521 |
| | | | | 455/278.1 |
| 2011/0070855 | A1 * | 3/2011 | Mariotti | H04B 17/12 |
| | | | | 455/226.2 |
| 2011/0205930 | A1 * | 8/2011 | Rahman | H04L 5/0023 |
| | | | | 370/252 |
| 2014/0022125 | A1 * | 1/2014 | Zhu | H01Q 3/2611 |
| | | | | 342/368 |
| 2015/0092621 | A1 * | 4/2015 | Jalloul | H04L 5/1461 |
| | | | | 370/278 |
| 2015/0236772 | A1 * | 8/2015 | Hammarwall | H04B 7/0617 |
| | | | | 370/329 |
| 2018/0123732 | A1 * | 5/2018 | Axmon | H04L 1/0033 |
| 2018/0198537 | A1 * | 7/2018 | Rexberg | H04B 17/14 |
| 2020/0280128 | A1 * | 9/2020 | Rafique | H01Q 3/267 |
| 2021/0399774 | A1 * | 12/2021 | Rafique | H04B 7/10 |

FOREIGN PATENT DOCUMENTS

| | | | | |
|---|---|---|---|---|
| CN | 106707250 | A | | 5/2017 |
| CN | 107085202 | A | | 8/2017 |
| EP | 1178562 | A1 * | 2/2002 | ............ H01Q 3/267 |
| EP | 2351243 | A1 * | 8/2011 | ............ H01Q 1/246 |
| SE | 200950604 | A1 * | 6/2010 | ........... B23K 9/0956 |
| WO | WO-9534103 | A1 * | 12/1995 | ............ H01Q 3/267 |
| WO | WO-9933169 | A2 * | 7/1999 | ........... H03F 1/3247 |
| WO | WO-0147061 | A1 * | 6/2001 | ............ H01Q 21/06 |
| WO | WO-0171850 | A1 * | 9/2001 | ........... H01Q 3/2605 |
| WO | WO-2004049558 | A1 * | 6/2004 | ........... H03F 1/3247 |
| WO | WO-2009142554 | A1 * | 11/2009 | ............ H01Q 1/005 |
| WO | WO-2010049784 | A1 * | 5/2010 | ............ H01Q 1/246 |
| WO | WO-2017001013 | A1 * | 1/2017 | ............ H01Q 1/243 |
| WO | WO-2020064128 | A1 * | 4/2020 | ........... H04B 7/0469 |

OTHER PUBLICATIONS

L. Zhang et al., "Layered-Division Multiplexing: An Enabling Technology for Multicast/Broadcast Service Delivery in 5G," in IEEE Communications Magazine, vol. 56, No. 3, pp. 82-90, Mar. 2018, doi: 10.1109/MCOM.2018.1700657. (Year: 2018).*

Layered Division Multiplexing (LDM) Summary, Electronics and Telecommunications Research Institute, 2018 (Year: 2018).*

J. Y. Lee et al., "Layered Division Multiplexing for ATSC 3.0: Implementation and Memory Use Aspects," in IEEE Transactions on Broadcasting, vol. 65, No. 3, pp. 496-503, Sep. 2019, doi: 10.1109/TBC.2019.2897750. (Year: 2019).*

Optimal Beam Forming in the Presence of Mutual Coupling by Roald Goossens and Hendrik Rogier—IEEE 2006.

PCT International Search Report issued for International application No. PCT/EP2018/076476—dated Apr. 25, 2019.

PCT Written Opinion of the International Searching Authority issued for International application No. PCT/EP2018/076476—dated Apr. 25, 2019.

* cited by examiner

FIG. 3

SYSTEMS AND METHODS FOR CORRECTION OF BEAM DIRECTION DUE TO SELF-COUPLING

PRIORITY

This nonprovisional application is a U.S. National Stage Filing under 35 U.S.C. § 371 of International Patent Application Serial No. PCT/EP2018/076476 filed Sep. 28, 2018 and entitled "Systems and Methods for Correction of Beam Direction Due to Self-Coupling" which is hereby incorporated by reference in its entirety.

TECHNICAL FIELD

The present disclosure relates to a beamforming radio system and, in particular, to correcting beam weighting factors to compensate for self-coupling between antenna elements having coherent signals in the radio system.

BACKGROUND

One key attribute for future Fifth Generation (5G) radio systems is increased capacity in radio networks. Beamforming is one technology that will be used by 5G radio systems to provide the desired increased capacity in an efficient manner. In particular, a 5G radio base station will utilize a large antenna array including tens if not hundreds of antennas, which are also referred to herein as antenna elements, where each antenna element is connected to a radio transceiver path. The antenna elements are implemented in what is referred to herein as an Active Antenna System (AAS). The AAS enables high data rate communication via beamforming, where spatial orthogonality ensures maximum Signal to Interference plus Noise Ratio (SINR). Beams, and in particular the direction of the beams, are created by adding special beam weighting factors for the antenna elements of the AAS. Beamforming also enables spatial multiplexing where multiple beams are utilized on the same time and frequency resources. This can be done because the beams are orthogonal to one another. For Multiple User Multiple Input Multiple Output (MU-MIMO) and Massive Multiple Input Multiple Output (M-MIMO), the beam width is generally narrow to have beam orthogonality.

When using spatial multiplexing, the maximum data rate depends on the directivity. With narrow beams, if the beams of the transmitter and the receiver are not aligned, then received signal strength will be lower. As an example, in a case of a 5-degree width of beam, a 2.5-degree deviation in beam alignment will result in a 3 Decibel (dB) reduction in power. With reduced power, SINR increases, and thus overall data rate decreases.

One of the major causes for beam misalignment is self-coupling between the antenna elements within the AAS, which is generally not taken into consideration when calculating the beam weighting factors. In the absence of any tapering, the beam weighting factors are generally calculated from the azimuth and elevation directions of the receiver and corresponding position of the antenna elements in the transmitting AAS. But particularly in a high frequency AAS, there could be strong coupling between individual antenna elements. Additionally, during operation, operational characteristics of the power amplifiers in the transmitter branches coupled to the antenna elements can change and, as such, the impedance mismatch between the power amplifiers and the antenna elements can vary over time. As a result, a signal at a first antenna element can couple to a second antenna element, be reflected at the antenna port, and radiate from the second antenna element. Further, variation in impedance results in a variation in a transfer function of the coupled signal. This unwanted coupled signal affects the combined signal and corresponding beam direction. The problem is severe when the beam is steered from boresight to any other angle.

Thus, there is a need for compensation for this coupled signal. In an integrated radio system (e.g., Ericsson's Antenna Integrated Radio (AIR) system), it is very difficult to extract the coupling value between the antenna elements. The problem is much more critical when the coupling is in between co-polarization elements. Without the knowledge of coupling, this correction cannot be done and, thus, data rate cannot be improved.

SUMMARY

Systems and methods are disclosed herein for correcting beam weighting factors for a radio system that uses transmit and/or receive beamforming in such a manner as to correct for self-coupling between antenna elements in the radio system. In some embodiments, a radio system comprises an antenna system and a processing unit associated with the antenna system. The antenna system comprises a plurality of dual-polarized antenna elements, a plurality of transmit branches coupled to the plurality of dual-polarized antenna elements, respectively, and a plurality of receive branches coupled to the plurality of dual-polarized antenna elements, respectively. The processing unit is adapted to obtain measurements of cross-polarization transfer functions between respective pairs of the plurality of dual-polarized antenna elements and compute coupling values for respective pairs of the plurality of dual-polarized antenna elements and reflection coefficient values for a plurality of power amplifiers in the plurality of transmit branches, respectively. The processing unit computes these values by numerically solving a system of equations in which the measurements of the cross-polarization transfer functions of the respective pairs of the plurality of dual-polarized antenna elements are a function of the coupling values for the respective pairs of the plurality of dual-polarized antenna elements and the reflection coefficient values and a subset of the coupling values are set to zero. The subset of the coupling values that are set to zero are those for predetermined pairs of the plurality of dual-polarized antenna elements. The processing unit is further adapted to compute correction factors for the plurality of dual-polarized antenna elements based on the coupling values and the reflection coefficient values and calculate beam weighting factors for at least a subset of the plurality of dual-polarized antenna elements based on the respective correction factors.

In some embodiments, the processing unit is further adapted to transmit or receive, via the antenna system, a signal via the at least a subset of the plurality of dual-polarized antenna elements using the beam weighting factors.

In some embodiments, the predetermined pairs of the plurality of dual-polarized antenna elements are those for which coupling is known to be less than a threshold amount of coupling.

In some embodiments, each antenna element of the plurality of dual-polarized antenna elements has a first input/output connection for a first polarization and a second input/output connection for a second polarization. Further, in order to obtain the measurements of the cross-polarization transfer functions between respective pairs of the plurality of dual-polarized antenna elements, the processing unit is further adapted to, for each pair of the plurality of dual-polarized antenna elements, obtain a measurement of the cross-polarization transfer function from the first input/output connection of a first antenna element of the pair for the first polarization to the second input/output connection of a second antenna element of the pair for the second polarization and obtain a measurement of the cross-polarization transfer function from the second input/output connection of the first antenna element of the pair for the second polarization to the first input/output connection of the second antenna element of the pair for the first polarization. In some embodiments, the system of equations comprises a first set of equations that define the measurements of the cross-polarization transfer functions of the respective pairs of the plurality of dual-polarized antenna elements as a function of the coupling values for the respective pairs of the plurality of dual-polarized antenna elements and the reflection coefficient values and a second set of equations that set the subset of the coupling values to zero. In some embodiments, the first set of equations define the measurements of the cross-polarization transfer functions of the respective pairs of the plurality of dual-polarized antenna elements as:

$$M_{ik} \approx \left(1 - \sum_{j}^{N;j \neq i} St_{ji} e^{jk(R_j - R_i)_{cal}}\right)\left(Sx_{ik} - \sum_{j}^{j \neq i} \gamma_{tj} St_{ij} Sx_{jk} - \sum_{l}^{l \neq k} Sx_{il} Sr_{kl}\right)$$

where $M_{ik}$ is the measurement for the pair of antenna elements consisting of an i-th antenna element as a transmitting antenna element and a k-th antenna element as a receiving antenna element; N is a total number of antenna elements; $St_{ij}$ is a co-polarization coupling between the i-th antenna element and a j-th antenna element, the j-th antenna element also being a transmitting antenna element using the same polarization as the i-th antenna element; $Sr_{kl}$ is a co-polarization coupling between the k-th antenna element and an l-th antenna element, the l-th antenna element also being a receiving antenna element using the same polarization as the k-th antenna element; $Sx_{ik}$ is a cross-polarization coupling between the i-th antenna element and the k-th antenna element; $\gamma_{tj}$ is the reflection coefficient value for a power amplifier of the transmit branch coupled to the j-th antenna element;

$$k = \frac{2\pi}{\lambda}$$

is a wave factor with $\lambda$ as a wave length of a frequency of operation of the radio system; and $(R_j - R_i)_{cal}$ is a difference between: (a) distance $(R_j)$ from the j-th antenna element to a receiver during initial calibration of the antenna elements and (b) distance $(R_i)$ and from the i-th antenna element to the receiver.

In some embodiments, the processing unit is further adapted to update the reflection coefficient values and update the correction factors based on the updated reflection coefficient values. In some embodiments, in order to update the reflection coefficient values, the processing unit is further adapted to, for each antenna element of the plurality of dual-polarized antenna elements for each beam direction of a plurality of beam directions, obtain a beam-based measurement of a ratio of a transmitted signal transmitted via at least a subset of the plurality of dual-polarized antenna elements at the beam direction and a respective captured signal received via the antenna element. In order to update the reflection coefficient values, the processing unit is further adapted to compute the updated reflection coefficient values based on the beam-based measurements.

Embodiments of a method in a radio system comprising an antenna system comprising a plurality of dual-polarized antenna elements, a plurality of transmit branches coupled to the plurality of dual-polarized antenna elements, respectively, and a plurality of receive branches coupled to the plurality of dual-polarized antenna elements, respectively, are also disclosed. In some embodiments, the method comprises obtaining measurements of cross-polarization transfer functions between respective pairs of the plurality of dual-polarized antenna elements and computing coupling values for respective pairs of the plurality of dual-polarized antenna elements and reflection coefficient values for a plurality of power amplifiers in the plurality of transmit branches, respectively, by numerically solving a system of equations in which the measurements of the cross-polarization transfer functions of the respective pairs of the plurality of dual-polarized antenna elements are a function of the coupling values for the respective pairs of the plurality of dual-polarized antenna elements and the reflection coefficient values and a subset of the coupling values are set to zero, wherein the subset of the coupling values are those for predetermined pairs of the plurality of dual-polarized antenna elements. The method further comprises computing correction factors for the plurality of dual-polarized antenna elements based on the coupling values and the reflection coefficient values and calculating beam weighting factors for at least a subset of the plurality of dual-polarized antenna elements based on the respective correction factors.

In some embodiments, the method further comprises transmitting or receiving, via the antenna system, a signal via the at least a subset of the plurality of dual-polarized antenna elements using the beam weighting factors.

In some embodiments, the predetermined pairs of the plurality of dual-polarized antenna elements are those for which coupling is known to be less than a threshold amount of coupling.

In some embodiments, each antenna element of the plurality of dual-polarized antenna elements has a first input/output connection for a first polarization and a second input/output connection for a second polarization, and obtaining the measurements of the cross-polarization transfer functions between respective pairs of the plurality of dual-polarized antenna elements comprises, for each pair of the plurality of dual-polarized antenna elements, obtaining a measurement of the cross-polarization transfer function from the first input/output connection of a first antenna element of the pair for the first polarization to the second input/output connection of a second antenna element of the pair for the second polarization and obtaining a measurement of the cross-polarization transfer function from the second input/output connection of the first antenna element of the pair for the second polarization to the first input/output connection of the second antenna element of the pair for the first polarization. In some embodiments, the system of equations comprises a first set of equations that define the measurements of the cross-polarization transfer functions of the respective pairs of the plurality of dual-polarized antenna elements as a function of the coupling values for the respective pairs of the plurality of dual-polarized antenna elements and the reflection coefficient values and a second set of equations that set the subset of the coupling values to zero. In some embodiments, the first set of equations define the measurements of the cross-polarization transfer functions of the respective pairs of the plurality of dual-polarized antenna elements as:

$$M_{ik} \approx \left(1 - \sum_{j}^{N;j \neq i} St_{ji} e^{jk(R_j - R_i)_{cal}}\right)\left(Sx_{ik} - \sum_{j}^{j \neq i} \gamma_{tj} St_{ij} Sx_{jk} - \sum_{l}^{l \neq k} Sx_{il} Sr_{kl}\right)$$

where $M_{ik}$ is the measurement for the pair of antenna elements consisting of an i-th antenna element as a transmitting antenna element and a k-th antenna element as a receiving antenna element; N is a total number of antenna elements; $St_{ij}$ is a co-polarization coupling between the i-th antenna element and a j-th antenna element, the j-th antenna element also being a transmitting antenna element using the same polarization as the i-th antenna element; $Sr_{kl}$ is a co-polarization coupling between the k-th antenna element and an l-th antenna element, the l-th antenna element also being a receiving antenna element using the same polarization as the k-th antenna element; $Sx_{ik}$ is a cross-polarization coupling between the i-th antenna element and the k-th antenna element; $\gamma_{tj}$ is the reflection coefficient value for a power amplifier of the transmit branch coupled to the j-th antenna element;

$$k = \frac{2\pi}{\lambda}$$

is a wave factor with $\lambda$ as a wave length of a frequency of operation of the radio system; and $(R_j - R_i)_{cal}$ is a difference between: (a) distance $(R_j)$ from the j-th antenna element to a receiver and (b) distance $(R_i)$ and from the i-th antenna element to the receiver.

In some embodiments, the method further comprises updating the reflection coefficient values and updating the correction factors based on the updated reflection coefficient values. In some embodiments, updating the reflection coefficient values comprises, for each antenna element of the plurality of dual-polarized antenna elements for each beam direction of a plurality of beam directions, obtaining a beam-based measurement of a ratio of a transmitted signal transmitted via at least a subset of the plurality of dual-polarized antenna elements at the beam direction and a respective captured signal received via the antenna element. Updating the reflection coefficient values further comprises computing the updated reflection coefficient values based on the beam-based measurements.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates one example of a two-dimensional implementation of the antenna array of the antenna system of FIGS. 1 and 2;

DETAILED DESCRIPTION

Figure 1:
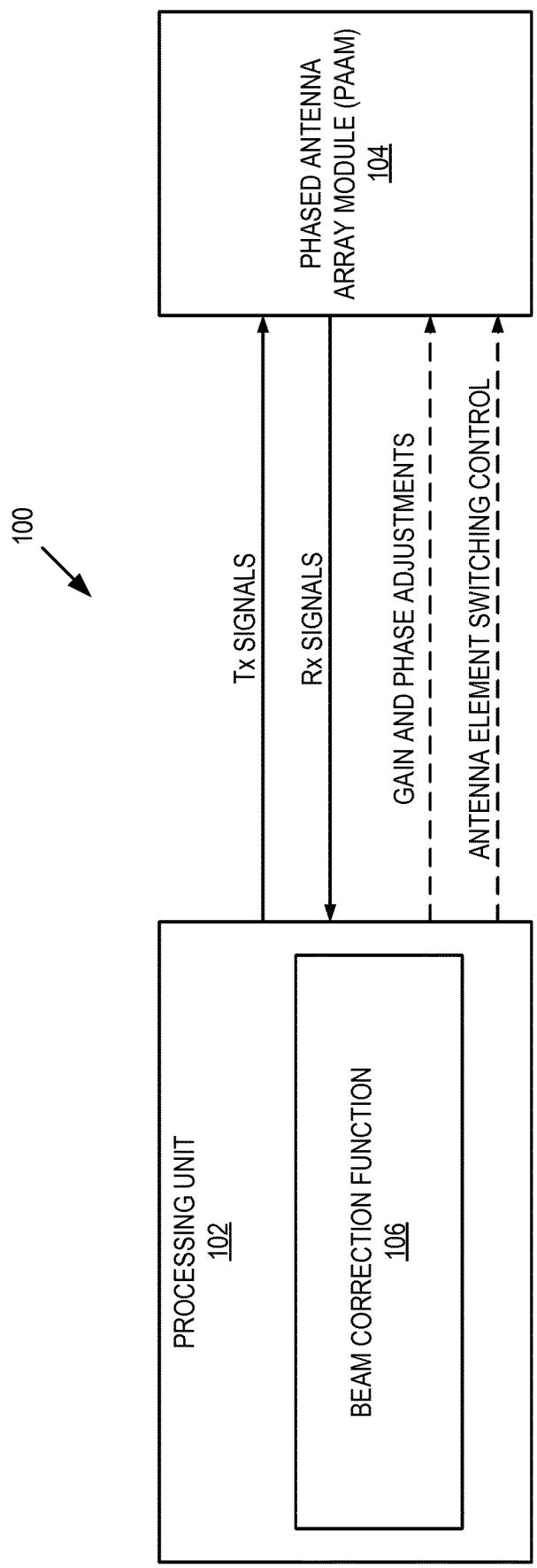
FIG. 1 illustrates an example embodiment of a radio system that provides beam correction according to embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Systems and methods are disclosed herein for correcting beam weighting factors for multiple beams that utilize the same time and frequency resources in such a manner that corrects for self-coupling between antenna elements, thereby improving orthogonality between the beams, and therefore improving Signal to Interference plus Noise Ratio (SINR) and thus data rates. In some embodiments, element-to-element transfer functions between the antenna elements of a radio system are extracted using self-measurements of the element-to-element transfer functions on a properly calibrated antenna system. The self-measurements are then used together with a system of equations to numerically solve for a coupling factor between each pair of antenna elements and a reflection coefficient for each power amplifier of each transmit branch of the radio system. In order to reduce the number of unknowns in the system of equations such that the system of equations is over-deterministic, within the system of equations, the coupling factors for a predetermined subset of the pairs of antenna elements are set to zero. This predetermined subset includes those pairs of antenna elements that are predetermined (e.g., via simulation) to have little to no coupling (e.g., less than a predetermined threshold amount of coupling due to, e.g., the distance between the two antenna elements in the pair). After solving the system of equations, the coupling factors and the reflection coefficients are used to compute correction factors that are applied to beam weighting factors for the respective antenna elements in order to create beams that have been corrected for self-coupling between the antenna elements.

While not being limited to or by any particular advantage, embodiments of the present disclosure provide a number of advantages. For example, the embodiments described herein do not require hardware modifications and can be performed with minimum downtime. Further, no additional measurement setup is needed, except for the first production calibration (e.g., Over-the-Air (OTA) measurement) setup.

FIG. 1 illustrates an example embodiment of a radio system 100 that provides beam correction to compensate for self-coupling between antenna elements according to embodiments of the present disclosure. The radio system 100 is also referred to herein as a beamforming transceiver. The radio system 100 is preferably a radio access node in a cellular communications network (e.g., a base station in a 3GPP 5G NR network) or implemented in a radio access node in a cellular communications system. However, the radio system 100 may alternatively be, for example, an access point in a local wireless network (e.g., an access point in a WiFi network), a wireless communication device (e.g., a UE in a 3GPP 5G NR network), or the like. The radio system 100 performs beamforming via an antenna array. This beamforming may be, e.g., analog beamforming, which is performed by controlling gain and phase for each antenna branch via respective gain and phase control elements. However, it should be appreciated that, in some other embodiments, the radio system 100 may perform, e.g., hybrid beamforming, i.e., perform beamforming partly in the digital domain and partly in the analog domain, or may perform digital beamforming (i.e., beamforming fully in the digital domain). Preferably, the radio system 100 utilizes beamforming for transmission and/or reception. For instance, as an example, beamforming may be used for Multi User Multiple Input Multiple Output (MU-MIMO) operation.

As illustrated, the radio system 100 includes a processing unit 102 and a Phased Antenna Array Module (PAAM) 104. Note that the term "PAAM" is used herein only for reference. Other names may be used. For example, the PAAM 104 may also be referred to herein as an Advanced (or Active) Antenna System (AAS) or simply an antenna system. In some embodiments, the PAAM 104 is implemented as one or more radio Application Specific Integrated Circuits (ASICs), and the processing unit 102 is a baseband processing unit implemented as, e.g., one or more processors such as, e.g., one or more Central Processing Units (CPUs), one or more baseband ASICs, one or more Field Programmable Gate Arrays (FPGAs), or the like, or any combination thereof.

As discussed below in detail, the PAAM 104 includes an antenna array. The antenna array includes many Antenna Elements (AEs). The PAAM 104 includes separate transmit branches (also referred to herein as transmit paths) and separate receive branches (also referred to herein as receive paths) for each AE. As an example, each transmit branch includes a gain control element and a phase control element that are controlled by the processing unit 102 to provide gain and phase calibration between the transmit branches and, in some embodiments, analog beamforming for signals transmitted by the radio system 100. Note that analog calibration and analog beamforming are shown herein as an example; however, the present disclosure is not limited thereto. Likewise, each receive branch includes a gain control element and a phase control element that are controlled by the processing unit 102 to provide gain and phase calibration between the receive branches, and in some embodiments, analog beamforming for signals received by the radio system 100.

The processing unit 102 includes a beam correction function 106. The beam correction function 106 may be implemented in hardware or a combination of hardware and software. In some embodiments, at least some of the functionality of the beam correction function 106 described herein is implemented in software that is executed by one or more processors (e.g., one or more CPUs, one or more ASICs, one or more FGPAs, or the like, or any combination thereof). In an alternative, the beam correction function 106 is implemented "in the cloud" or implemented as a virtualized apparatus (e.g., a virtual machine) running in a virtualization environment on a network node (e.g., a computer or similar network node) connected to the processing unit 102 and/or the PAAM 104 via a network connection. As described below in detail, when the radio system 100 is to transmit or receive in multiple beam directions simultaneously, the beam correction function 106 computes, for each of those beams, correction factors to be applied to a set of beam weighting factors for the beam that compensates for self-coupling between antenna elements. In this manner, improved SINR and thus increased data rates can be achieved.

Figure 2:
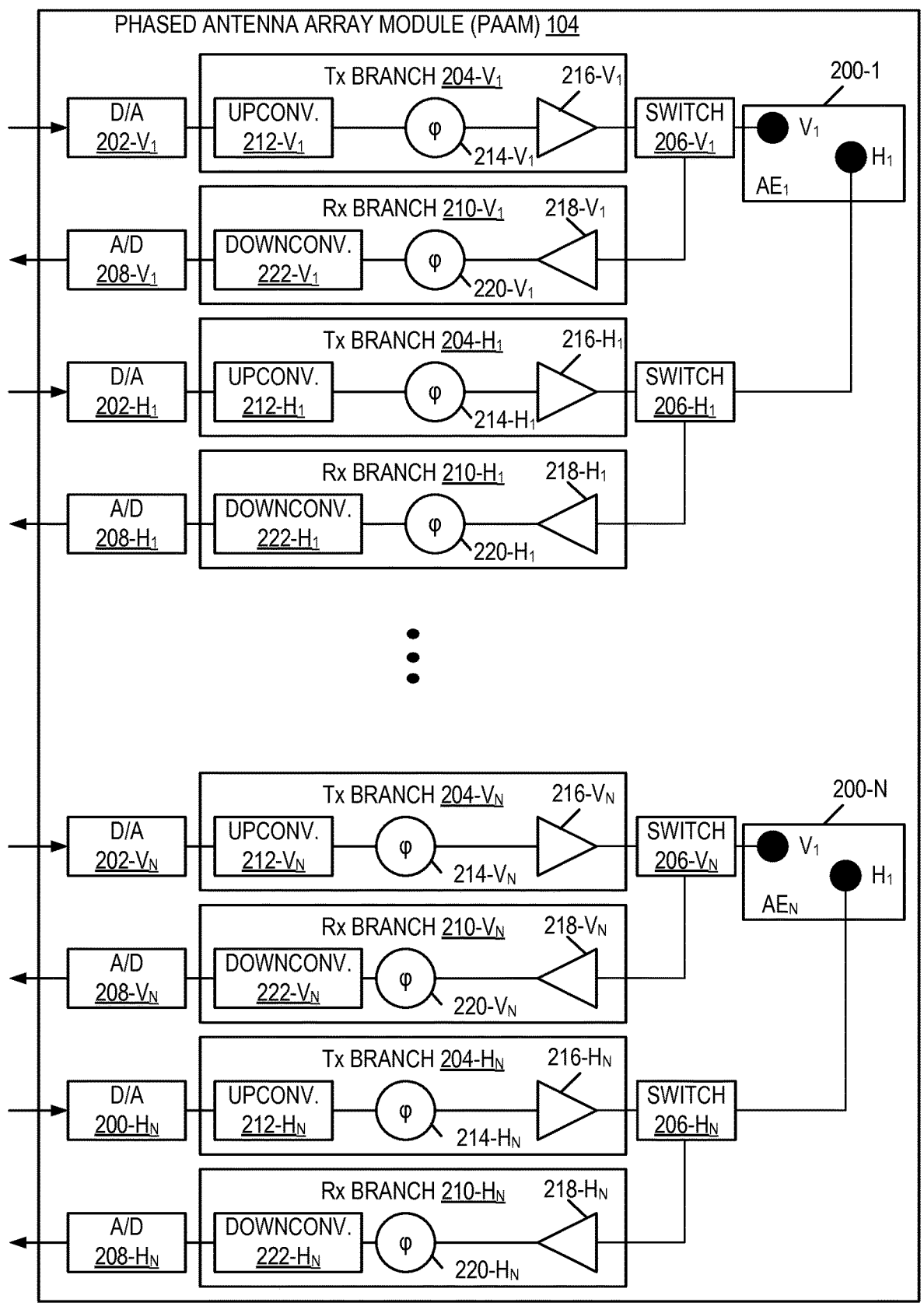
FIG. 2 illustrates one example of antenna system of FIG. 1.
Figure 3:
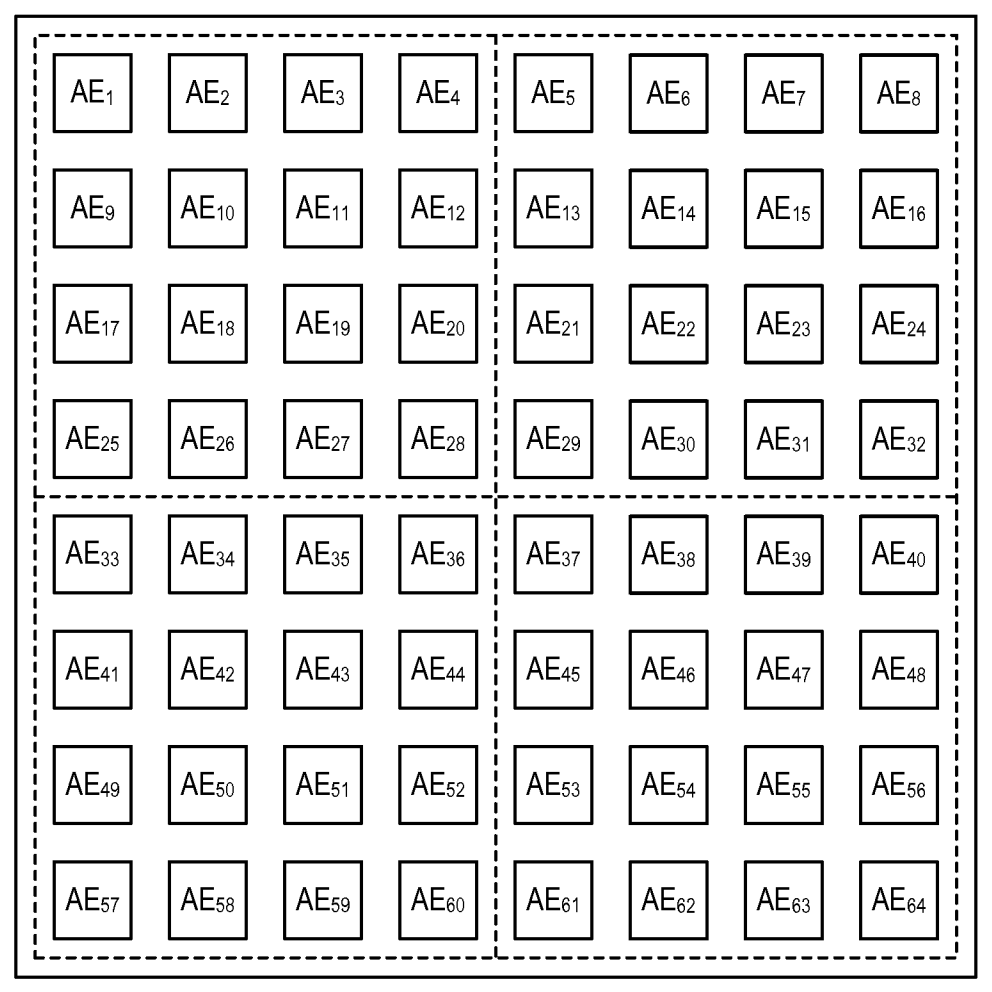

FIG. 2 illustrates one example of the PAAM 104. As illustrated in FIG. 2, the PAAM 104 includes AEs 200-1 through 200-N, where N=A×B where A×B defines the dimensions of a Two-Dimensional (2D) matrix of AEs into which the AEs 200-1 through 200-N are arranged. The AEs 200-1 through 200-N are generally referred to herein collectively as AEs 200 and individually as AE 200. FIG. 3 illustrates one example of such a 2D matrix in which N=8 and M=8, such that there are 64 AEs 200 arranged into a 2D matrix. In the example of FIG. 3, the AEs 200 are implemented on four separate Integrated Circuits (ICs) (e.g., four separate radio ASICs), as indicated by the dashed boxes. Returning to FIG. 2, in the illustrated example, each AE 200 is a dual-polarized AE having two polarizations, namely, a vertical polarization and a horizontal polarization having respective inputs. For example, the AE 200-1 has a first Input/Output (I/O) port ($V_1$) for the vertical polarization and a second I/O port ($H_1$) for the horizontal polarization.

In this example with two polarizations, for the vertical polarization of each i-th AE 200-$i$ (where i=1, 2, ..., N), the PAAM 104 includes a Digital to Analog (D/A) converter 202-$V_i$ and a transmit (Tx) branch 204-$V_i$ coupled to the vertical I/O port ($V_i$) of the AE 200-$i$ via a Rx-Tx switch, 206-$V_i$ for the transmit direction and an Analog to Digital (A/D) converter 208-$V_i$ and a receive (Rx) branch 210-$V_i$ coupled to the vertical I/O port ($V_i$) of the AE 200-$i$ via the switch 206-$V_i$. The Tx branch 204-$V_i$ includes upconversion circuitry 212-$V_i$, a phase adjustor, or phase control element, 214-$V_i$, and an amplifier, or gain control element, 216-$V_i$. While not illustrated, the phase adjustor 214-$V_i$ and the amplifier 216-$V_i$ are controlled by the processing unit 102 to thereby control the gain and phase of the Tx branch 204-$V_i$. Similarly, the Rx branch 210-$V_i$ includes an amplifier, or gain control element, 218-$V_i$, a phase adjustor, or phase control element, 220-$V_i$, and downconversion circuitry 222-$V_i$. While not illustrated, the amplifier 218-$V_i$ and the phase adjustor 220-$V_i$ are controlled by the processing unit 102 to thereby control the gain and phase of the Rx branch 210-$V_i$.

For the horizontal polarization of each i-th AE 200-$i$ (where i=1, 2, ..., N), the PAAM 104 includes a D/A converter 202-$H_i$ and a Tx branch 204-$H_i$ coupled to the horizontal I/O port ($H_i$) of the AE 200-$i$ via a switch 206-$H_i$ for the transmit direction and an A/D converter 208-$H_i$ and a Rx branch 210-$H_i$ coupled to the horizontal I/O port ($H_i$) of the AE 200-$i$ via the switch 206-$H_i$. The Tx branch 204-$H_i$ includes upconversion circuitry 212-$H_i$, a phase adjustor, or phase control element, 214-$H_i$, and an amplifier, or gain control element, 216-$H_i$. While not illustrated, the phase adjustor 214-$H_i$ and the amplifier 216-$H_i$ are controlled by the processing unit 102 to thereby control the gain and phase of the Tx branch 204-$H_i$. Similarly, the Rx branch 210-$H_i$ includes an amplifier, or gain control element, 218-$H_i$, a phase adjustor, or phase control element, 220-$H_i$, and downconversion circuitry 222-$H_i$. While not illustrated, the amplifier 218-$H_i$ and the phase adjustor 220-$H_i$ are controlled by the processing unit 102 to thereby control the gain and phase of the Rx branch 210-$H_i$.

Notably, when an AE 200-$i$ is configured for Tx (i.e., coupled to the Tx branch 204-$V_i$ and/or the Tx branch 204-$H_i$), the AE 200-$i$ is referred to herein as a "Tx AE" or "transmit AE." Conversely, when an AE 200-$i$ is configured for Rx (i.e., coupled to the Rx branch 210-$V_i$ and/or the Rx branch 210-$H_i$), the AE 200-$i$ is referred to herein as an "Rx AE" or "receive AE."

Figure 4:
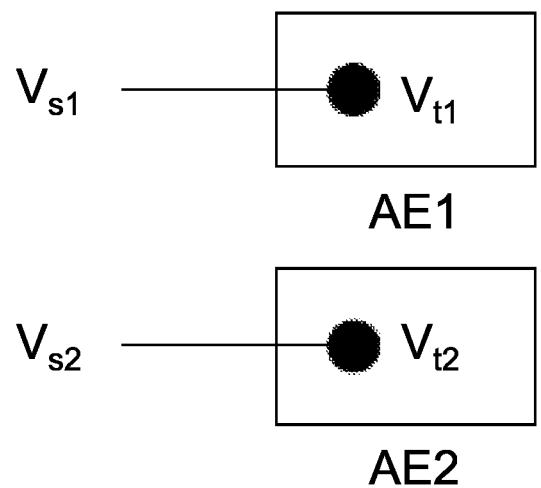
FIG. 4 illustrates two adjacent antenna elements.

As described below, the beam correction function 106 operates to correct the beam weighting factors for the AEs 200 to compensate for coupling between the AEs 200. In this regard, FIG. 4 shows two adjacent AEs 200, denoted here as AE 1 and AE 2. AE 1 and AE 2 have coupling between them. In the dual-polarization or two-port system, the coupling between AE 1 and AE 2 can be described by a scattering matrix [S], which is also referred to herein as a coupling matrix [S], as follows:

$$[S] = \begin{bmatrix} S_{11} & S_{12} \\ S_{21} & S_{22} \end{bmatrix}$$

where:

$$\begin{bmatrix} V_{t1} \\ V_{t2} \end{bmatrix} = \begin{bmatrix} S_{11} & S_{12} \\ S_{21} & S_{22} \end{bmatrix} \begin{bmatrix} V_{s1} \\ V_{s2} \end{bmatrix}$$

where $V_{s1}$ is a voltage wave input at AE 1, $V_{s2}$ is a voltage wave input at AE 2, $V_{t1}$ is a total voltage wave output (i.e., transmitted from) AE 1, and $V_{t2}$ is a total voltage wave output (i.e., transmitted from) AE 2. Then, when providing an input only to AE 1 (i.e., $V_{s2}$=0):

$$S_{11} = \frac{V_{t1}}{V_{s1}}, \text{ and}$$

$$s_{21} = \frac{V_{t2}}{V_{s1}}.$$

Likewise, when providing an input only to AE 2 (i.e., $V_{s1}$=0):

$$S_{12} = \frac{V_{t1}}{V_{s2}}, \text{ and}$$

$$s_{22} = \frac{V_{t2}}{V_{s2}}.$$

In this use case, $S_{12}$ and $S_{21}$ are coupling between AEs without any physical contacts. Further, $S_{12}$ and $S_{21}$ are the same, just opposite direction.

Thus, in FIG. 4, $V_{s1}$ and $V_{s2}$ are the source signals, and the total signal voltage output at AE 2 in presence of the coupled signal from AE 1 is denoted as $V_{t2}$, which can be expressed as:

$$V_{t2} = V_{s2} - \gamma_2 S_{21} V_{t1} \tag{1}$$

where $\gamma_2$ is a reflection coefficient for the power amplifier 216 in the Tx branch 204 coupled to AE 1 and can be expressed as:

$$\gamma_2 = \frac{1}{1 - S_{22}}.$$

Similarly, if it is assumed that $1 \gg \gamma_1 S_{12} \gamma_2 S_{21}$, then $V_{t1} \approx V_{s1}$ and thus the coupling contribution at AE 2 to the coupling with AE 1 can be expressed as:

$$V_{t2} = -\gamma_2 S_{21} V_{s1}$$

A source surface current ($I_s$) at the AEs 200-1 through 200-N and an effective surface current ($I_e$) due to coupling between the AEs 200-1 through 200-N can be expressed as:

$$\begin{bmatrix} 1 & -\gamma_1 S_{12} & \cdots & -\gamma_1 S_{1N} \\ -\gamma_2 S_{21} & 1 & \cdots & -\gamma_2 S_{1N} \\ \vdots & \vdots & \ddots & \vdots \\ -\gamma_N S_{N1} & -\gamma_N S_{N2} & \cdots & 1 \end{bmatrix} \cdot [I_s] = [I_e] \tag{2}$$

where $-\gamma_1, -\gamma_2, \ldots, -\gamma_N$ are the reflection coefficients for the power amplifiers 216 for the Tx branches 204 of AE 200-1 through AE 200-N, respectively, $[I_s]$ is a matrix comprising source surface currents $I_{s1}, I_{s2}, \ldots, I_{sN}$ at the AEs 200-1 through 200-N, and $[I_e]$ is a matrix comprising source surface currents $I_{e1}, I_{e2}, \ldots, I_{eN}$ at the AEs 200-1 through 200-N, respectively.

Figure 5:
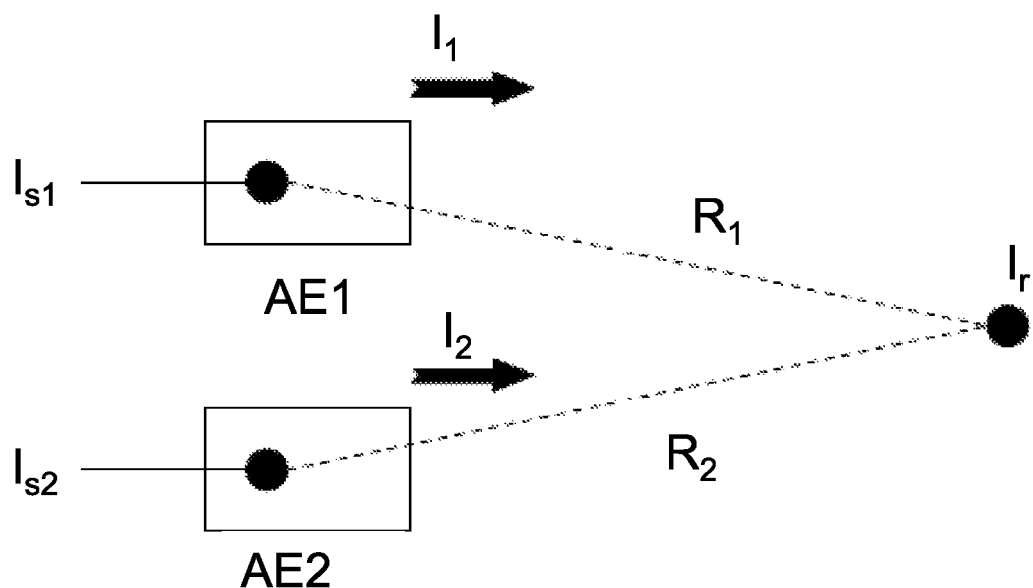
FIG. 5 illustrates distance between two antenna elements and a far-field Over-the-Air (OTA) measurement receiver.

As illustrated in FIG. 5, it is assumed that the distance between AE 1 and AE 2 and the far-field OTA measurement receiver used for calibration, respectively, are $R_1$ and $R_2$ respectively. When the receiver antenna is sufficiently far away from the PAAM 104, $R_1 \to R_2$. The current flow on AE 1 and AE 2 is proportional to the total signal of AE 1 and AE 2 ($I_{e1}$ and $I_{e2}$). The normalized received signal $I_r$, equivalent to field, $\|E\|$ at the receiver normalizing path loss factor can be expressed as:

$$I_r = \|E\| = I_{e1} \cdot e^{jkR_1} + I_{e2} \cdot e^{jkR_2},$$

where $$k = \frac{2\pi}{\lambda}$$

is the wave factor with $\lambda$ as the wave length of the frequency. Thus, $$I_r = I_{e1} \cdot e^{jkR_1} + I_{e2} \cdot e^{jkR_2}$$

In a case in which only AE 1 is active:

$$I_{r1} = I_{s1}(1 e^{jkR_1} - \gamma_2 S_{21} e^{jkR_2})$$

Now at far field $R_1 = R_2$ such that:

$$I_{r1} = I_{s1}(1 - \gamma_2 S_{21}) e^{jkR_0}$$

For multiple AEs, the total normalized received signal, or current, can then be expressed as:

$$I_r = \sum_{i}^{i=N} I_{si} \left(1 - \sum_{j}^{N; j \neq i} \gamma_j S_{ji}\right)$$

The desired beam correction factor per AE (denoted here as the i-th AE, AE i) for proper beam direction is:

$$Ctx_i = \left(1 - \sum_{j}^{N; j \neq i} \gamma_j S_{ji}\right)^{-1} \quad (3)$$

To calculate the beam correction factor $Ctx_i$, the coupling matrix $S_{ji}$ and the reflection coefficients of the individual Power Amplifiers (PAs) $\gamma_j$ need to be determined. When applying the beam correction factor $Ctx_i$, for a beam direction of $(\alpha, \beta)$, the complete beam weighting factor of the i-th AE can be computed as:

$$W_i = Ctx_i \cdot e^{jk(\alpha N_x + \beta N_y)} \quad (4)$$

where $N_x$ is the physical distance coefficient for azimuth direction and $N_y$ is the physical distance coefficient for elevation direction.

Standard calibration measurement with finite distance between the measurement AE (i.e., the Rx AE) and Tx AE and when the rest of the AEs 200 are properly terminated while all Tx AEs are radiating and measuring at one Rx AE:

$$I_r = \sum_{i}^{i=N} I_{si}\left(1 - \sum_{j}^{N; j \neq i} S_{ji} e^{jk(R_j - R_i)}\right)$$

Figure 6:
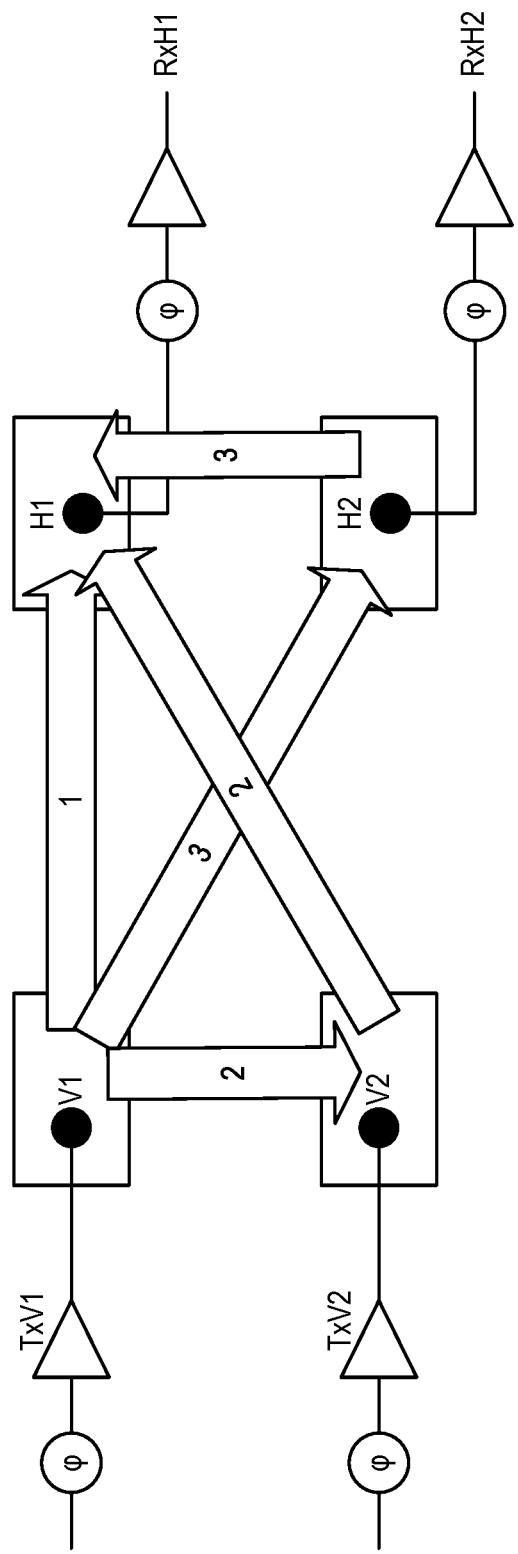
FIG. 6 illustrates three major coupling paths for two adjacent antenna elements.

Now, a description of the basis for performing self-measurements for extraction of the coupling matrix [S] is provided. In this regard, FIG. 6 shows a setup of two AEs where two polarizations are considered. Note that, in FIG. 6, different boxes are used to show the different input/output ports for horizontal and vertical polarizations of the same. Thus, it is to be understood that V1 and H1 in FIG. 6 denote the vertical and horizontal input/output ports of the same AE, referred to here as AE 1. Likewise, it is to be understood that V2 and H2 in FIG. 6 denote the vertical and horizontal input/output ports of the same AE, referred to here as AE 2. In vertical polarization, two AEs are active for Tx and are therefore referred to as (active) Tx AEs. In horizontal polarization, two AEs are active for Rx and are therefore referred to as (active) Rx AEs. It is assumed that there are three major paths for the Tx signal at V1 to be received at H1. These three paths are:

a directly coupled path from V1 to H1 illustrated by the arrow labeled as #1, an indirectly coupled path from V1 to H1 through the co-polarized V2, which is illustrated by the two arrows labelled #2, and an indirectly coupled path from V1 to H1 through the cross-polarized H2, which is illustrated by the two arrows labelled #3.

Here, it is considered that only AE 1 is transmitting a signal (TxV1) via V1 and only AE 1 is receiving a resulting coupled signal (RxH1) via H1. In terms of normalized current, the transmit signal (TxV1) is denoted here as $I_{t1}$, and the receive signal (RxH1) is denoted here as $I_{r1}$. A measurement ($M_{11}$) of the effective transfer function in cross-polarization between V1 and H1 of AE 1 can then be made by sending the Tx signal ($I_{t1}$) via V1 while measuring the Rx signal ($I_{r1}$) at H1 and then performing a division:

$$M_{11} = \frac{I_{r1}}{I_{t1}}$$

If there are N number of Tx AEs and M number of Rx AEs in other polarization, the received signal ($I_{rk}$) at k-th Rx AE when i-th Tx AE is active can be expressed as:

$$I_{rk} = I_{ti}\left(\gamma_{rk} Sx_{ik} - \sum_{j}^{j \neq i} \gamma_{rk} Sx_{jk} \gamma_{tj} St_{ij} - \sum_{l}^{l \neq k} \gamma_{rk} Sr_{kl} \gamma_{rl} Sx_{il}\right)$$

where $Sx_{ik}$ is the cross-polarization coupling between i-th Tx element and k-th Rx element, $St_{ij}$ is the co-polarization coupling between i-th and j-th Tx elements and $Sr_{kl}$ is the co-polarization coupling between k-th and l-th Rx elements. Thus $$M_{ik} = \gamma_{rk}\left(1 - \sum_{j}^{N; j \neq i} St_{ji} e^{jk(R_j - R_i)}{}_{cal}\right)\left(Sx_{ik} - \sum_{j}^{j \neq i} \gamma_{tj} St_{ij} Sx_{jk} - \sum_{l}^{l \neq k} \gamma_{rl} Sx_{il} Sr_{kl}\right)$$

where the unknowns are $\gamma_{tj}$, $\gamma_{rk}$, $St_{ij}$, $Sr_{kl}$ and $Sx_{ik}$. Notably, the notation of $St_{ij}$ is used to clearly indicate that this coupling parameter is between the i-th and j-th Tx AEs. Likewise, the notation of $Sr_{kl}$ is used to clearly indicate that this coupling parameter is between the k-th and l-th Rx AEs; however, $Sr_{kl}$ is the element $S_{kl}$ in the coupling matrix [S]. Likewise, the notation of $Sx_{ik}$ is used to clearly indicate that this coupling parameter is between the i-th Tx AE and k-th Rx AEs.

It can be assumed that receivers are perfectly matched ($\gamma_{rk} \to 1$). Then, measurements in two polarization combinations can be assumed as being for the same polarization (i.e., $St_{ij} = Sr_{ij}$). Thus, $$M_{ik} \approx \left(1 - \sum_{j}^{N; j \neq i} St_{ji} e^{jk(R_j - R_i)_{cal}}\right) \left(Sx_{ik} - \sum_{j}^{j \neq i} \gamma_{tj} St_{ij} Sx_{jk} - \sum_{l}^{l \neq k} Sx_{il} Sr_{kl}\right) \quad (5)$$

where $(R_j - R_i)_{cal}$ is the difference between the distances $R_j$ and $R_i$ between the j-th and i-th AEs and the receiver used for OTA calibration during production, respectively.

By assuming that the calibration receiver was at an infinite distance (i.e., far away) from the PAAM 104 during calibration, Equation (5) can be further reduced to:

$$M_{ik} \approx \left(1 - \sum_{j}^{N; j \neq i} St_{ji}\right) \left(Sx_{ik} - \sum_{j}^{j \neq i} \gamma_{tj} St_{ij} Sx_{jk} - \sum_{l}^{l \neq k} Sx_{il} Sr_{kl}\right)$$

Figure 7:
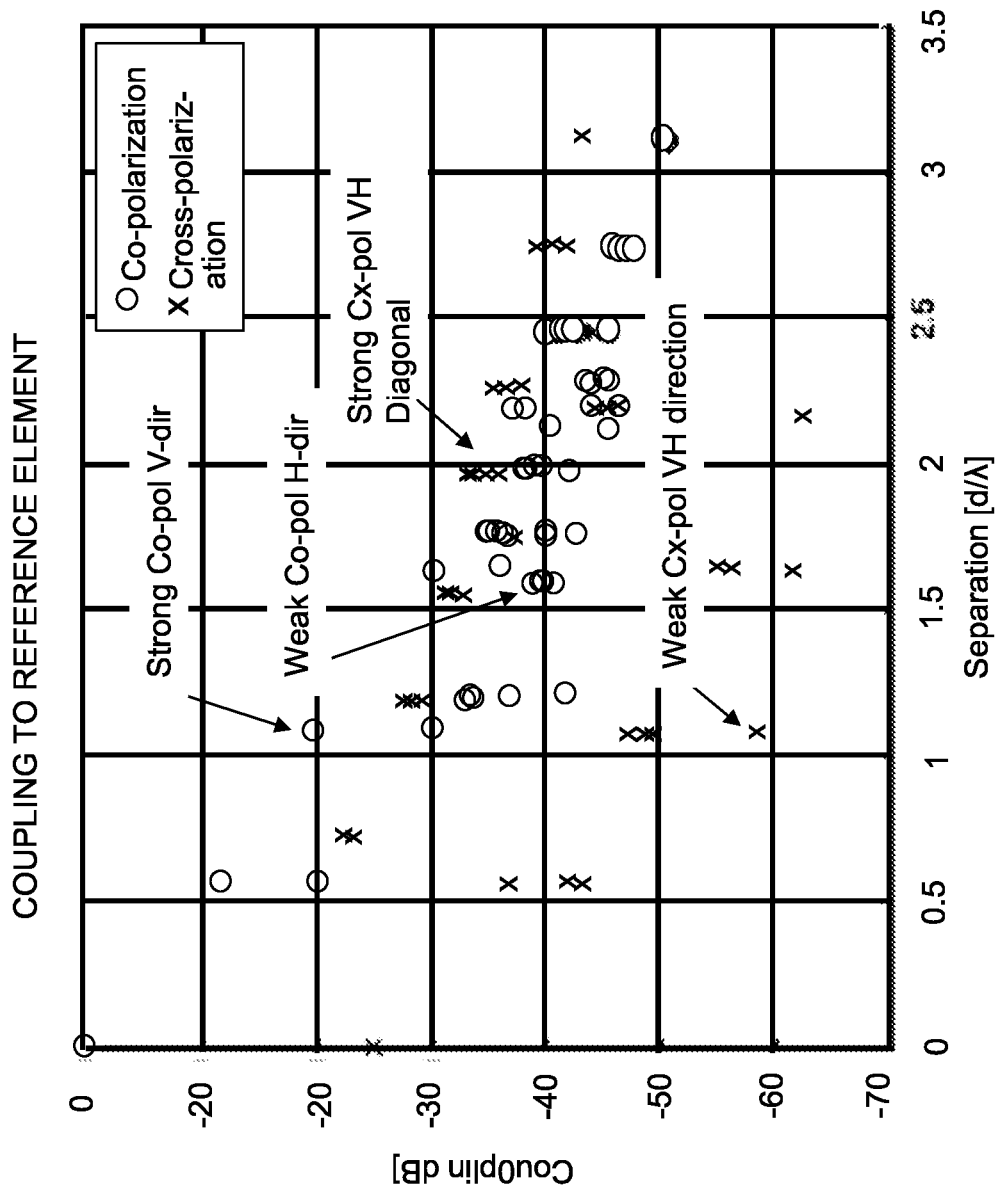
FIG. 7 illustrates simulation results showing the amount of coupling between antenna elements as a function of physical separation between the antenna elements.

However, if measurements are made for both directions (i.e., for both Tx and Rx) for both polarizations, the total number of measurement is $N_m = 2 \cdot N^2 \approx N_U$ as $N_U = 3N^2$, which is an under-deterministic solution for Equation (5). However, the solution proposed herein sets a pre-known or predetermined subset of the coupling parameters $St_{ij}$, $Sr_{kl}$ and $Sx_{ik}$ to a value of zero (0). More specifically, due to the distance between the AEs 200 and the position of the AEs 200, many of the coupling factors $St_{ij}$, $Sr_{kl}$ and $Sx_{ik}$ can, by default, be set to zero. By doing so, the number of unknowns can be reduced to have an over-deterministic solution. As an example, for co- and cross-polarization, any of the coupling parameters $St_{ij}$, $Sr_{kl}$ and $Sx_{ik}$ that are pre-known or predetermined (e.g., via simulation) to be less than a predetermined threshold (e.g., −50 dBc) are set to zero. That decision can be taken based on the physical position of the respective pair of AEs 200. In this regard, FIG. 7 illustrates simulation results for one particular implementation of the PAAM 104. Note that measurements also show similar results. Also, note that, in the millimeter wave (mmW), the coupling pattern might be different.

After setting the pre-known or predetermined subset of the coupling parameters $St_{ij}$, $Sr_{kl}$ and $Sx_{ik}$ to zero as described above, the resulting system of equations derived from Equation (5) above can be solved using any suitable numerical method such as, e.g., the well known Newton Raphson Method.

Figure 8:
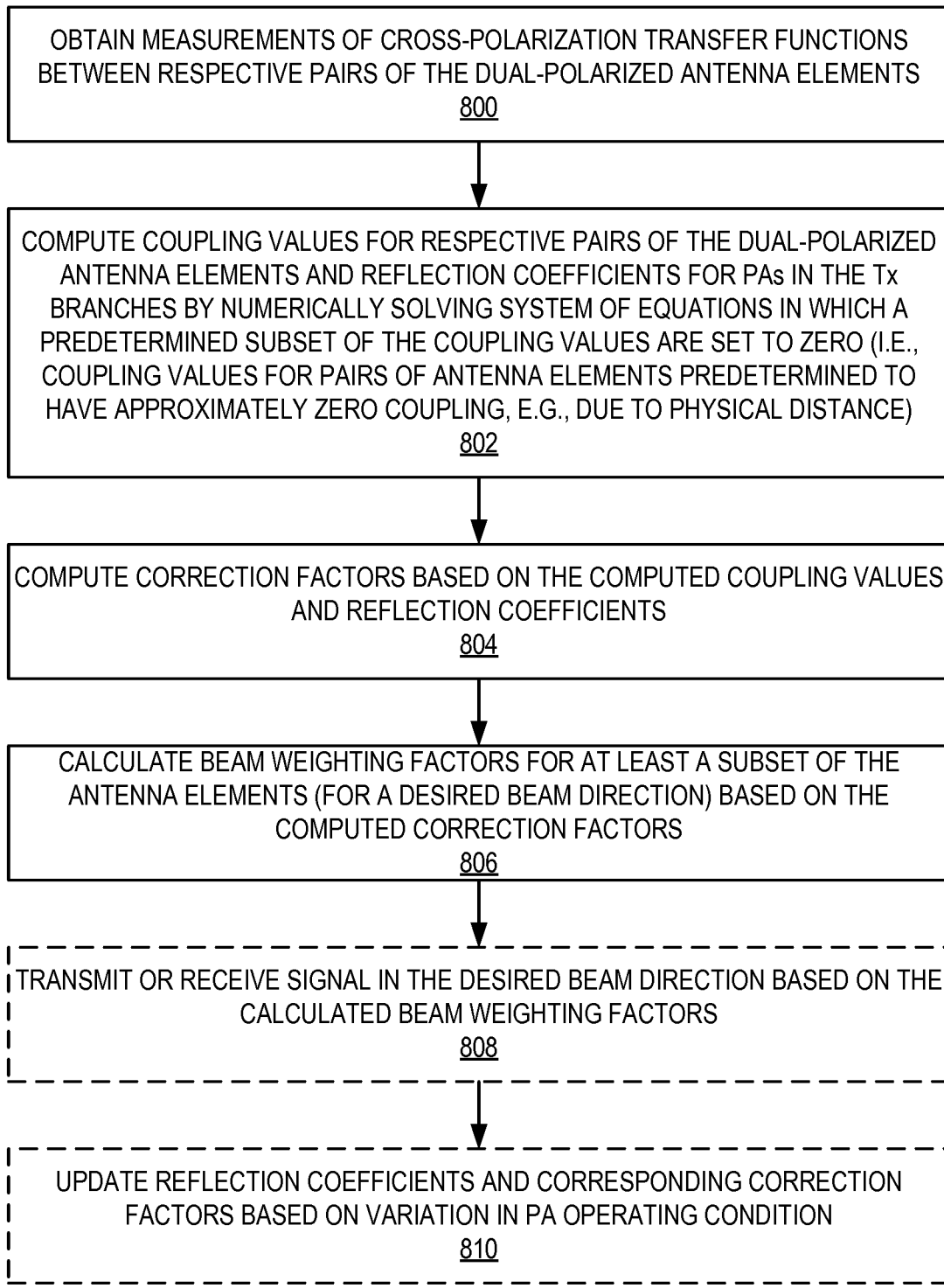
FIG. 8 is a flow chart that illustrates a process for computing corrected beam weighting factors for antenna elements according to some embodiments of the present disclosure.

FIG. 8 is a flow chart that illustrates a process for computing corrected beam weighting factors for the AEs 200 in accordance with the solution described above according to some embodiments of the present disclosure. This process is described herein as being performed by the radio system 100, but is not limited thereto. Optional steps are represented by dashed boxes.

As illustrated, the beam correction function 106 obtains measurements of the (effective) cross-polarization transfer functions between respective pairs of the dual-polarized antenna elements (step 800). The details of this step will be described below in detail with respect to FIG. 10. However, in general, for each pair of AEs 200 including a Tx AE in one polarization and an Rx AE in the other polarization, a signal is transmitted via the Tx AE and the resulting coupled signal received at the Rx AE is measured. The Tx signal and the Rx signal are cross-correlated, and then the Rx signal is divided by the Tx signal to obtain a measurement of the cross-polarization transfer function between the Tx AE and the Rx AE. This is repeated for each possible combination of Tx AE and Rx AE for both polarizations.

The beam correction function 106 then computes the coupling parameters (also referred to herein as coupling values) for respective pairs of the AEs 200 and the reflection coefficients for the power amplifiers 216 in the Tx branches 204 by numerically solving a system of equations in which a predetermined subset of the coupling parameters are set to zero (step 802). More specifically, in one preferred embodiment, the system of equations includes a first set of equations based on Equation (5) above and a second set of equations in which the predetermined subset of the coupling parameters are set to zero. As discussed above, this system of equations be solved using any appropriate method such as, for example, the Newton method.

Once the coupling values and reflection coefficients have been computed, the beam correction function 106 computes correction factors for the AEs 200 based on the coupling values and reflection coefficients, e.g., in accordance with Equation (3) above (step 804). The beam correction function 106 then calculates (corrected) beam weighting factors for at least a subset of the AEs 200 based on the respective beam correction factors, e.g., in accordance with Equation (4) above (step 806). For example, for a particular beam direction, the beam correction function 106 computes beam weighting factors for the AEs 200 (or some subset of the AEs 200 used to create that beam direction) using the beam correction factors.

Optionally, the radio system 100 uses the calculated beam weighting factors to transmit (or receive) a signal in the desired beam direction (step 808).

Optionally, during operation, the radio system 100, and in particular the beam correction function 106, updates the reflection coefficients and the corresponding beam correction factors to compensate for variation, e.g., in the operating conditions of the power amplifiers 216 (step 810). The updated beam correction factors can then be used by the radio system 100 to calculate beam weighting factors for desired beam directions, which are then used to transit or receive at those desired beam directions. The details for how measurements are obtained and used to update the reflection coefficients are provided below with respect to FIGS. 11A and 11B.

Figure 9:
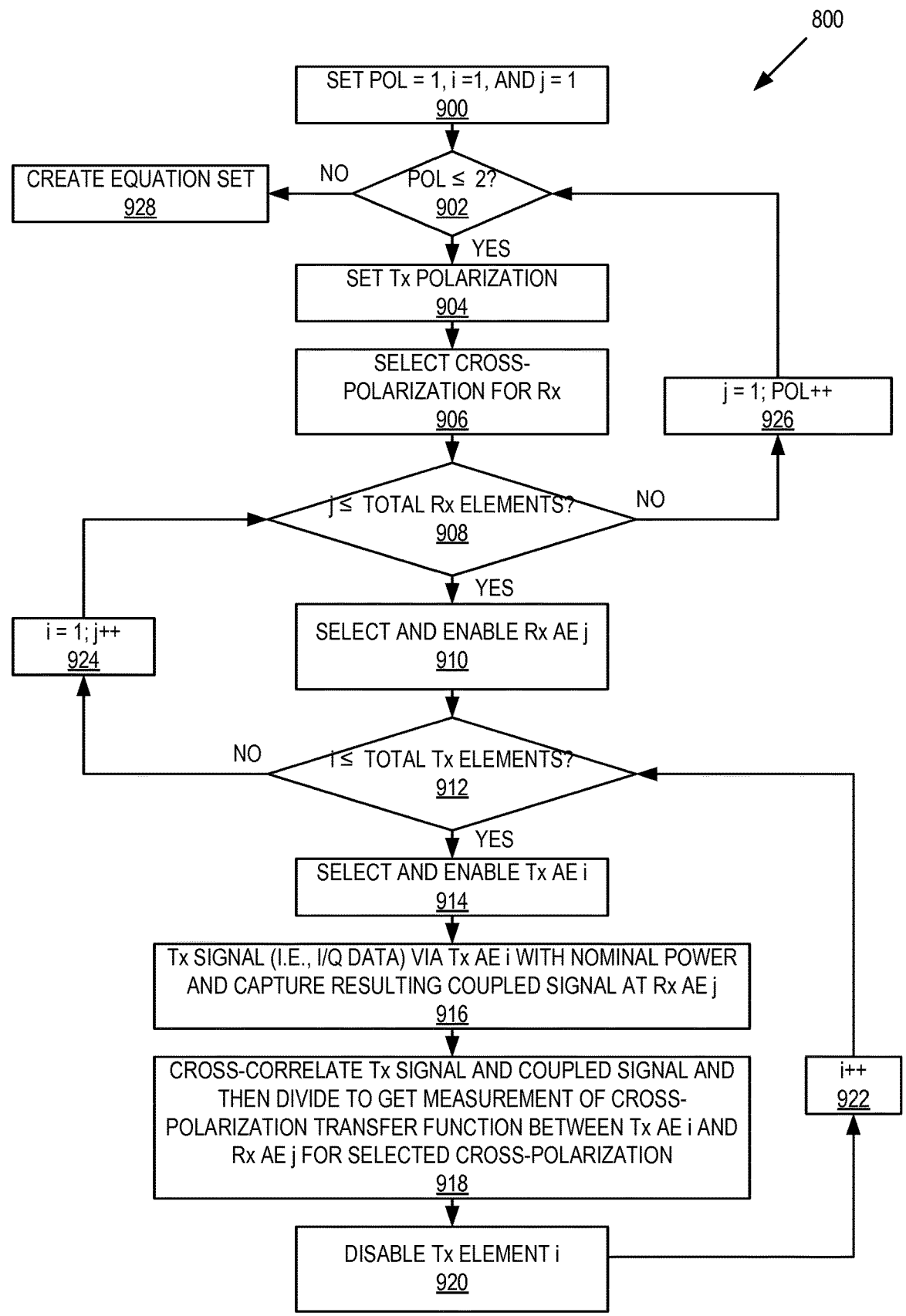
FIG. 9 is a flow chart that illustrates a more detailed embodiment of the measurement step of FIG. 8 in accordance with some embodiments of the present disclosure.

FIG. 9 is a flow chart that illustrates a more detailed embodiment of step 800 of FIG. 8 in accordance with some embodiments of the present disclosure. As illustrated, a polarization counter (POL), a Tx AE counter (i), and an Rx AE counter (j) are all initiated to a value of 1 (step 900). A determination is made as to whether POL≤2 (step 902). If so, the polarization to be used for transmitting the signal for measurement is set (step 904). As an example, the Tx polarization is set to the vertical polarization if POL=1 and set to the horizontal polarization if POL=2. The cross-polarization (i.e., the polarization opposite to the set Tx polarization) is selected as the Rx polarization (step 906).

A determination is made as to whether j≤the total number of Rx AEs (step 908). If so, AE j is selected and enabled for Rx and is thus referred to here as Rx AE j (step 910). A determination is then made as to whether i≤the total number of Tx AEs (step 912). If so, AE i is selected and enabled for Tx and is thus referred to here as Tx AE i (step 914). A Tx signal is then transmitted via Tx AE i, preferably with nominal Tx power, and the resulting coupled signal at Rx AE j is measured (i.e., captured) (step 916). The Tx signal and the coupled signal are cross-correlated (i.e., time-aligned) and then the coupled signal is divided by the Tx signal to obtain a measurement of the cross-polarization transfer function between Tx AE i and Rx AE j for the selected cross-polarization (step 918). Tx AE i is then disabled (step 920), the counter i is incremented (step 922), and the process returns to step 912. Steps 914-922 are repeated to obtain measurements for all Tx AEs for Rx AE j. Once all of these measurements have been obtained (step 912, NO), the Tx AE counter i is reset to 1 and the Rx AE counter j is incremented (step 924). The process then returns to step 908. Steps 910-924 are then repeated to obtain measurements for the remaining Rx AEs.

Once measurements have been obtained for all pairs of Tx and Rx AEs for the polarizations initially set in steps 904 and 906 (step 908, NO), the Rx AE counter j is reset to a value of 1 and the polarization counter POL is incremented (step 926). The process then returns to step 902 and is repeated for the opposite Tx and Rx polarizations. Once measurements have been obtained for both cross-polarizations (step 902, NO), the system of equations used for computing the coupling factors and reflection coefficients in step 802 of FIG. 8 is created (step 928).

Figure 10:
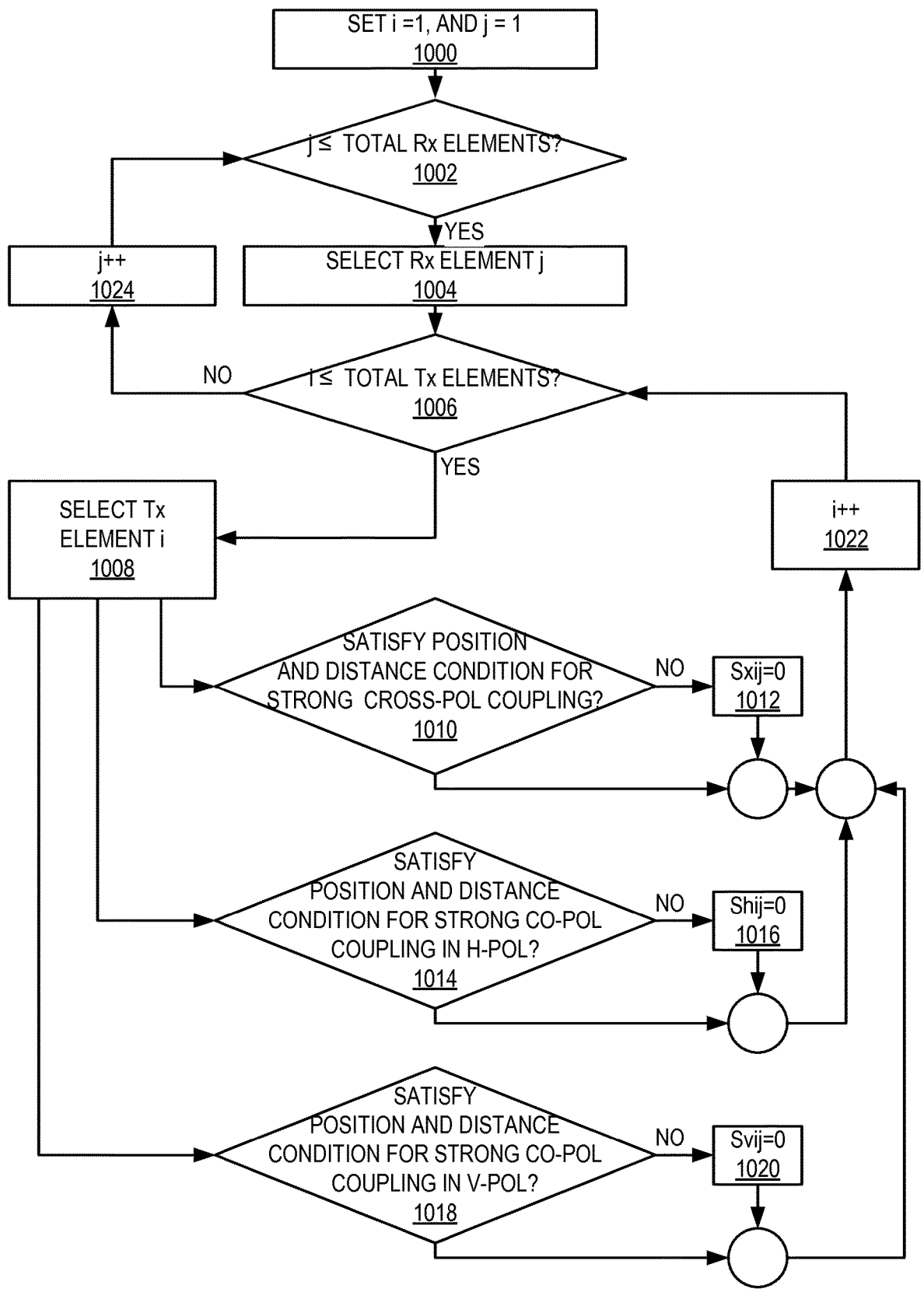
FIG. 10 is a flow chart that illustrates one example process for deciding which of the coupling factors are set to zero.

As discussed above, within the system of equations used to compute the coupling factors and reflection coefficients in step 802 of FIG. 8, a predetermined subset of the coupling factors are set to zero. FIG. 10 is a flow chart that illustrates one example process for deciding which of the coupling factors are set to zero. A Tx AE counter i and a Rx AE counter j are both initialized to values of 1 (step 1000). A determination is made as to whether j≤the total number of Rx AEs (step 1002). If so, the j-th AE is selected as the Rx AE, which is denoted here as RX AE j (step 1004). A determination is made as to whether i≤the total number of Tx AEs (step 1006). If so, the i-th AE is selected as the Tx AE, which is denoted here as Tx AE l (step 1008). The, three decisions are made based on predetermined information, e.g., derived from simulation results. First, a decision is made as to whether the AE pair (i.e., the Tx AE i and the Rx AE j) satisfy a position and distance condition for strong cross-polarization coupling (step 1010). If not (i.e., if the cross-polarization coupling is weak), then the coupling parameter $Sx_{ij}$ is set to zero (step 1012). In other words, $Sx_{ij}$ is set to zero both for the equations in which Tx is the horizontal polarization and Rx is the vertical polarization and for the equations in which Tx is the vertical polarization and Rx is the horizontal polarization. Second, a decision is made as to whether the AE pair (i.e., the Tx AE i and the Rx AE j) satisfy a position and distance condition for strong co-polarization coupling for the horizontal polarization (step 1014). If not (i.e., if the co-polarization coupling for the horizontal polarization is weak), then the coupling parameter $Sh_{ij}$ is set to zero (step 1016). Specifically, for the system of equations described above, this means that the coupling parameter $St_{ij}$ is set to zero in the equations in which Tx AE i and Tx AE j are both in the horizontal polarization and the coupling parameter $Sr_{ij}$ is set to zero in the equations in which Rx AE i and Rx AE j are both in the horizontal polarization. Note that if Tx is in the horizontal polarization, then Rx is in the vertical polarization, and vice versa. Third, a decision is made as to whether the AE pair (i.e., the Tx AE i and the Rx AE j) satisfy a position and distance condition for strong co-polarization coupling for the vertical polarization (step 1018). If not (i.e., if the co-polarization coupling for the vertical polarization is weak), then the coupling parameter $Sv_{ij}$ is set to zero (step 1020). Note that $Sv_{ij}=St_{ij}$ and $Sh_{ij}=Sr_{kl}$ used in previous equations. Specifically, for the system of equations described above, this means that the coupling parameter $St_{ij}$ is set to zero in the equations in which Tx AE i and Tx AE j are both in the vertical polarization and the coupling parameter $Sr_{ij}$ is set to zero in the equations in which Rx AE i and Rx AE j are both in the vertical polarization.

The Tx AE counter i is incremented (step 1022) and then the process returns to step 1006 and is repeated for the next Tx AE i. Steps 1008-1022 are repeated for all remaining Tx AEs. Once all of the Tx AEs have been processed (step 1006, NO), the Rx AE counter j is incremented (step 1024) and then the process returns to step 1002. Steps 1004 through 1024 are repeated for the remaining Rx AEs. Once finished, the process is complete.

As discussed above with respect to step 810, the reflection coefficients may be updated over time in order to compensate for variations in the operating conditions of the power amplifiers 216. The reflection coefficients can be updated by obtaining measurements "on the fly" during operation of the radio system 100. More specifically, all of the Tx AEs 200 are transmitting signals and thus impedance mismatch is changing. Therefore, a new correction for coupling matrix and thus phase alignment is beneficial. In this regard, if there are N number of Tx AEs and M number of Rx AEs in other polarization, the received signal ($I_{rk}$) at k-th Rx AE when i-th Tx AE is active can be expressed as:

$$I_{rk} = I_c \sum_i^N Wt_i \left(1 - \sum_j^{N; j \neq i} St_{ji} e^{jk(R_j - R_i)_{cal}}\right)\left(Sx_{ik} - \sum_j^{j \neq i} Sx_{jk} \gamma_{tj} St_{ij} - \sum_l^{l \neq k} Sr_{kl} Sx_{il}\right)$$

where Ic is the expected current vector per element after OTA calibration. After calibration, all AEs should have the same current. A measurement of can then be defined as:

$$Mo_{rk} = \sum_i^N Wt_i \left(1 - \sum_j^{N; j \neq i} St_{ji} e^{jk(R_j - R_i)_{cal}}\right)\left(Sx_{ik} - \sum_j^{j \neq i} Sx_{jk} \gamma_{tj} St_{ij} - \sum_l^{l \neq k} Sr_{kl} Sx_{il}\right)$$

Here, $Wt_i$ is the applied beam weighting factor for i-th Tx AE and $Mo_{rk}$ is the measured ratio of transmitted and captured signal for k-th Rx AE.

With multiple beam direction selection and different selection of Rx AE, a sufficient number of measurements can be obtained to extract updated reflection coefficients $\gamma_{tj}$ due to variation in power amplifier operating conditions using any numerical method to solve a corresponding system of equations based on Equation (6) below in the presence of known coupling parameters.

$$Mo_{rk} = \sum_{i}^{N} W_{T_i} Sx_{ik} - \sum_{i}^{N} \sum_{j}^{j \neq i} W_{T_i} Sx_{jk} \gamma_{tj} St_{ij} - \qquad (6)$$

$$\sum_{i}^{N} \sum_{l}^{l \neq k} W_{T_i} Sr_{kl} Sx_{il} - \sum_{i}^{N} W_{T_i} Sx_{ik} \sum_{j}^{N; j \neq i} St_{ji} e^{jk(R_j - R_i)}{}_{cal} +$$

$$\sum_{j}^{N; j \neq i} St_{ji} e^{jk(R_j - R_i)}{}_{cal} \sum_{i}^{N} \sum_{j}^{j \neq i} W_{T_i} Sx_{jk} \gamma_{tj} St_{ij} +$$

$$\sum_{j}^{N; j \neq i} St_{ji} e^{jk(R_j - R_i)}{}_{cal} \sum_{i}^{N} \sum_{l}^{l \neq k} W_{T_i} Sr_{kl} Sx_{il}$$

Figure 11A:
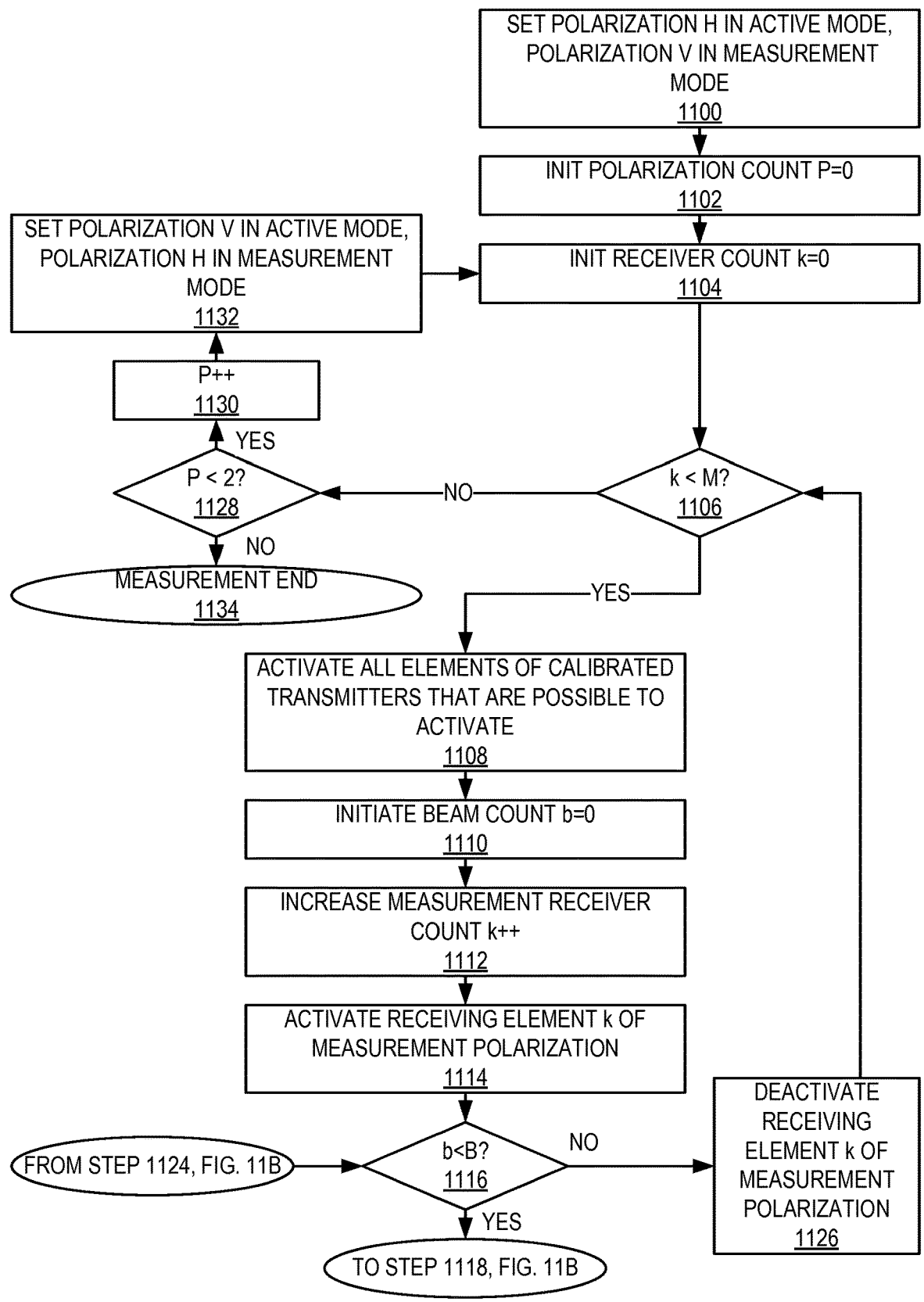
FIGS. 11A and 11B illustrate a flow chart for a process for obtaining measurements used to update reflection coefficient values in accordance with some embodiments of the present disclosure.
Figure 11B:
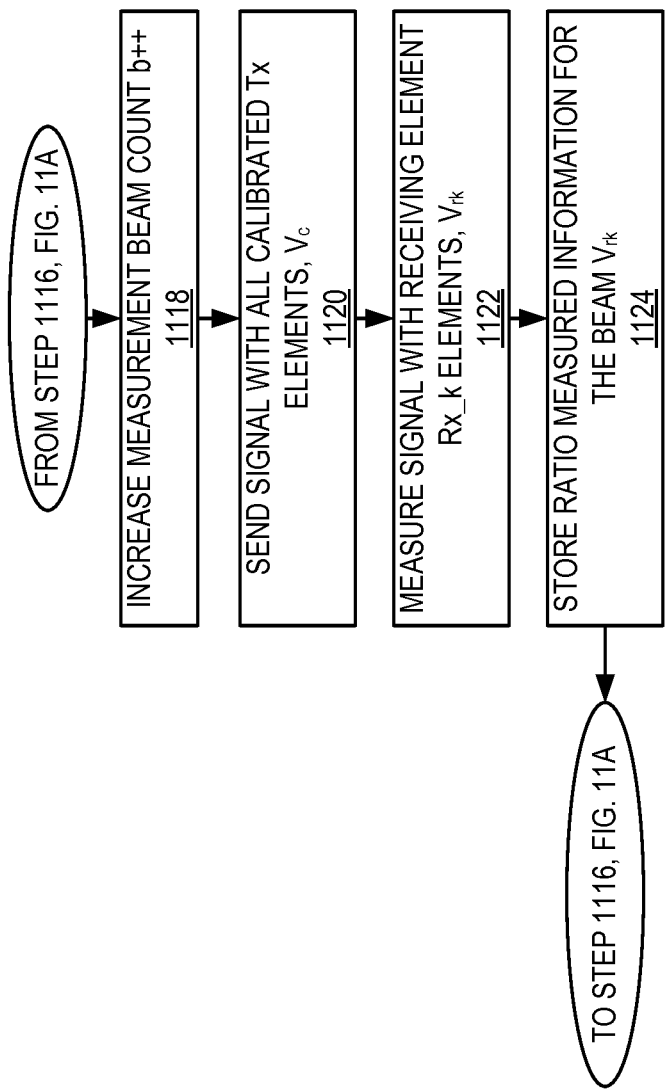

FIGS. 11A and 11B illustrate a flow chart for obtaining the measurements $Mo_{rk}$ used to solve for the updated reflection coefficients $\gamma_{tj}$ in accordance with some embodiments of the present disclosure. As illustrated, the active (Tx) polarization is set as the horizontal polarization and the measurement (Rx) polarization is set as the vertical polarization (step 1100). A polarization counter P is initialized to a value of zero (step 1102), and an Rx AE counter k is initialized to a value of zero (step 1104). A determination is made as to whether the Rx AE counter k is less than M, where M is the total number of Rx AEs (step 1106). If so, all Tx AEs of calibrated transmitters (i.e., transmitters that have been calibrated to have the same current vector, magnitude, and phase) are activated (step 1108). A beam counter b is initialized to a value of zero (step 1110), the Rx AE counter k is incremented (step 1112), and the Rx AE k is activated for the measurement polarization (step 1114). A determination is made as to whether b<B, where B is the total number of beams to be used for measurements (step 1116). If so, the beam counter b is incremented (step 1118), a signal ($V_c$) is transmitted via all of the activated Tx AEs (step 1120), and a resulting coupled signal ($V_{rk}$) at Rx AE k is measured (step 1122). A ratio of $V_{rk}/V_c$ is computed and stored as the measurement $Mo_{rk}$ (step 1124). The process then returns to step 1116, and steps 1118 through 1124 are repeated to obtain measurements for the remaining beams at Rx AE k. Once all of these measurements are obtained (step 1116, NO), Rx AE k is deactivated (step 1126) and the process returns to step 1106. Steps 1108 through 1126 are repeated to obtain measurements for the measurement polarization for the remaining Rx AEs. Once all of these measurements are obtained (step 1106, NO), a determination is made as to whether the polarization counter P is less than 2 (step 1128). If so, the polarization counter P is incremented (step 1130). In addition, the active (Tx) polarization is set to the vertical polarization and the measurement (Rx) polarization is set to the horizontal polarization (step 1132). The process then returns to step 1104 and the process is repeated to obtain measurements for the new active and measurement polarizations.

Once the process of FIGS. 11A and 11B is complete (step 1128, NO), all of the measurements $Mo_{rk}$ needed to solve for the updated reflection coefficients $\gamma_{tj}$ using the known coupling parameters are known (step 1134). Once the updated reflection coefficients $\gamma_{tj}$ have been computed, the respective beam correction factors are updated and subsequently used.

Figure 12:
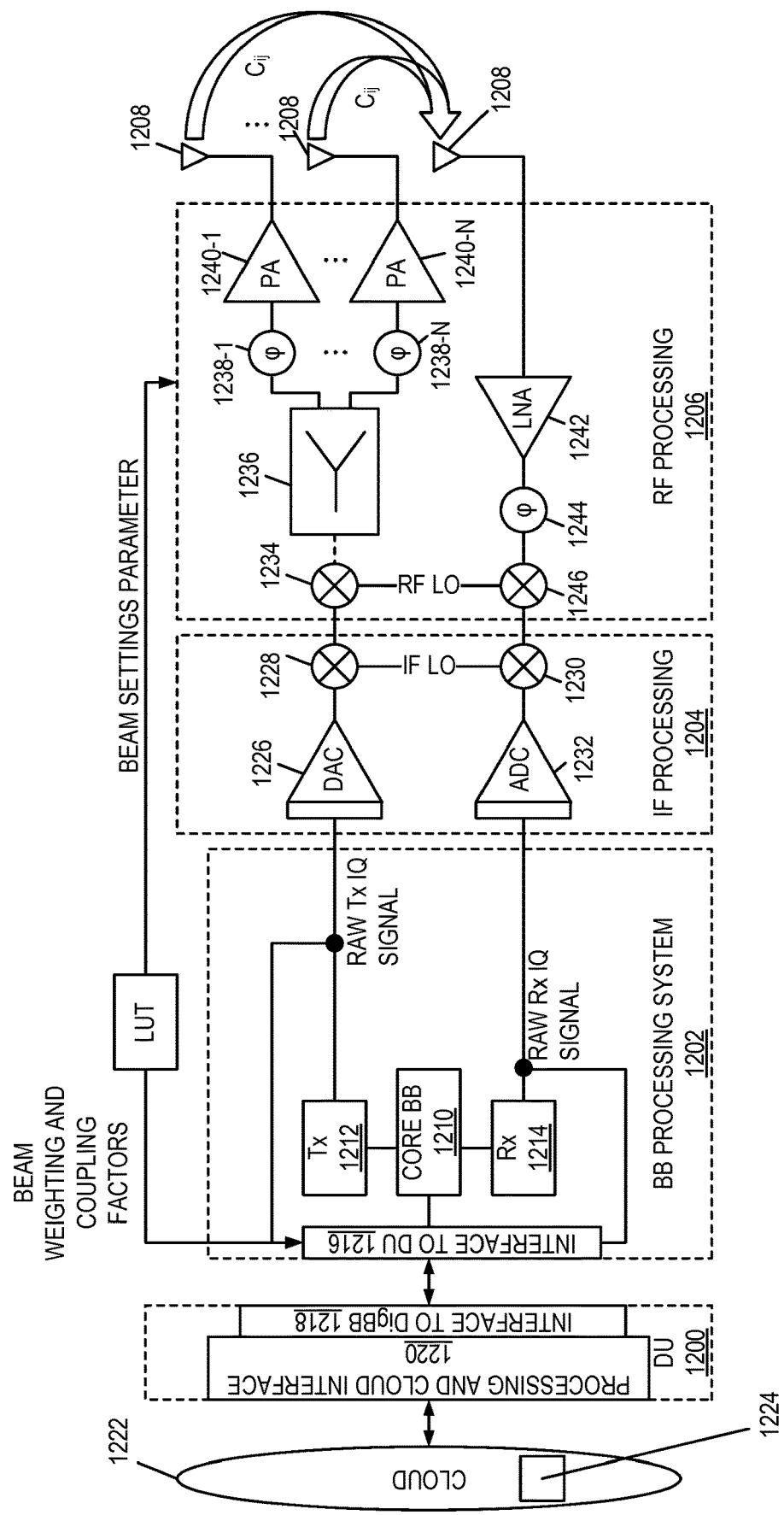
FIG. 12 illustrates one example cloud implementation of at least some aspects of the present disclosure.

FIG. 12 illustrates one example of a "cloud" implementation of at least some aspects of the present disclosure. In particular, FIG. 12 illustrates another example embodiment of the radio system 100. In this example embodiment, some of the functionality of the beam correction function 106 is implemented "in the cloud."

As illustrated in FIG. 12, the radio system 100 includes the processing unit, which in this example is implemented as a Digital Unit (DU) 1200 and a baseband processing system 1202, which may be implemented as, e.g., one or more ASICs. The radio system 100 also includes the PAAM 104, which in this example is includes Intermediate Frequency (IF) processing circuitry 1204, Radio Frequency (RF) processing circuitry 1206, and AEs 1208. The IF processing circuitry 1204 and the RF processing circuitry 1206 may be implemented on, e.g., one or more ASICs.

The DU 1200 communicatively couples the baseband processing system 1202 to the cloud. The baseband processing system 1202 includes a core baseband processor 1210, a baseband transmit processor 1212, a baseband receive processor 1214, and an interface 1216 to the DU 1200. The DU 1200 includes an interface 1218 to the baseband processing system 1202 and a processing and cloud interface block 1220 that performs processing for the DU 1200 and provides an interface to a cloud network 1222. The cloud network 1222 includes one or more processing nodes 1224 on which some of the functionality of the beam correction function 106 is implemented. The one or more processing nodes 1224 each include, e.g., one or more processors (e.g., one or more CPUs or the like), memory including software executable by the processor(s) to provide the desired functionality, and a network interface(s).

The IF processing circuitry 1204 includes a Digital-to-Analog Converter (DAC) 1226 and a mixer 1228 for digital to analog conversion and upconversion of the baseband transmit signal from baseband to IF prior to RF processing. In a similar manner, the IF processing circuitry 1204 includes a mixer 1230 and an Analog-to-Digital Converter (ADC) 1232 for downconversion and analog to digital conversion of the receive signal from RF to digital baseband.

The RF processing circuitry 1206 includes a mixer 1234 for upconversion of the transmit signal from IF to RF and a splitter 1236 that simultaneously provides the RF transmit signal to a number of transmit branches, each coupled to a respective Tx AE 1208. Here, there are N transmit branches including phase adjustment circuits 1238-1 through 1238-N and PAs 1240-1 through 1240-N (provide gain adjustment), respectively.

The RF processing circuitry 1206 also includes a Low Noise Amplifier (LNA) 1242 (can be used to provide Rx gain adjustment), a phase adjustment circuit 1244, and a mixer 1246 that form an RF receive path. The RF receive path is coupled to an activated Rx antenna element 1208 as described above.

With respect to measurement (e.g., in accordance with step 800 of FIG. 8 or the process of FIG. 9), in some embodiments, the measurements are provided to the processing node(s) 1224 in the cloud where they are used to compute the correction factors. The correction factors are returned to the baseband processing system 1202 where they are applied to compute the corrected beam weighting factors. In some embodiments, the measurements obtained for updating the reflection coefficients are provided to the processing node(s) 1224 in the cloud where they are used to compute the updated reflection coefficients. The updated reflection coefficients are then used to update the beam correction factors, which are returned to the baseband processing system 1202. However, this is only an example. The functionality of the beam correction function 106 may be fully implemented at the processing node(s) 1224 in the cloud network 1222 or distributed between the processing node(s) 1224 in the cloud network 1222 and the baseband processing system 1202 in any desired manner.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

2D Two-Dimensional
3GPP Third Generation Partnership Project
5G Fifth Generation
AAS Active Antenna System
ADC Analog-to-Digital Converter
AE Antenna Element
AIR Antenna Integrated Radio
AP Access Point
ASIC Application Specific Integrated Circuit
BSC Base Station Controller
BTS Base Transceiver Station
CD Compact Disk
COTS Commercial Off-the-Shelf
CPE Customer Premise Equipment
CPU Central Processing Unit
D2D Device-to-Device
D/A Digital to Analog
DAC Digital-to-Analog Converter
DAS Distributed Antenna System
dB Decibel
DSP Digital Signal Processor
DU Digital Unit
DVD Digital Video Disk
eNB Enhanced or Evolved Node B
E-SMLC Evolved Serving Mobile Location Center
FPGA Field Programmable Gate Array
GHz Gigahertz
gNB New Radio Base Station
GSM Global System for Mobile Communications
IC Integrated Circuit
IF Intermediate Frquency
I/O Input/Output
IoT Internet of Things
IP Internet Protocol
LEE Laptop Embedded Equipment
LME Laptop Mounted Equipment
LNA Low Noise Amplifier
LTE Long Term Evolution
M2M Machine-to-Machine
MANO Management and Orchestration
MCE Multi-Cell/Multicast Coordination Entity
MDT Minimization of Drive Tests
MIMO Multiple Input Multiple Output
MME Mobility Management Entity
M-MIMO Massive Multiple Input Multiple Output
mmW Millimeter Wave
MSC Mobile Switching Center
MSR Multi-Standard Radio
MTC Machine Type Communication
MU-MIMO Multiple User Multiple Input Multiple Output
NB-IoT Narrowband Internet of Things
NFV Network Function Virtualization
NIC Network Interface Controller
NR New Radio
O&M Operation and Maintenance
OSS Operations Support System
OTA Over-the-Air
OTT Over-the-Top
PA Power Amplifier
PAAM Phased Antenna Array Module
PDA Personal Digital Assistant
P-GW Packet Data Network Gateway
RAM Random Access Memory
RAN Radio Access Network
RAT Radio Access Technology
RF Radio Frequency
RNC Radio Network Controller
ROM Read Only Memory
RRH Remote Radio Head
RRU Remote Radio Unit
Rx Receive
SCEF Service Capability Exposure Function
SINR Signal to Interference plus Noise Ratio
SOC System on a Chip
SON Self-Organizing Network
Tx Transmit
UE User Equipment
USB Universal Serial Bus
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WCDMA Wideband Code Division Multiple Access
WiMax Worldwide Interoperability for Microwave Access Those skilled in the art will recognize improvements and modifications to the embodiments of the present disclosure. All such improvements and modifications are considered within the scope of the concepts disclosed herein.

The invention claimed is:

1. A radio system, comprising:
   an antenna system comprising:
      a plurality of dual-polarized antenna elements;

a plurality of transmit branches coupled to the plurality of dual-polarized antenna elements, respectively; and
a plurality of receive branches coupled to the plurality of dual-polarized antenna elements, respectively; and
a processing unit associated with the antenna system, the processing unit being adapted to:
obtain measurements of cross-polarization transfer functions between respective pairs of the plurality of dual-polarized antenna elements;
compute:
coupling values for the respective pairs of the plurality of dual-polarized antenna elements, and
reflection coefficient values for a plurality of power amplifiers in the plurality of transmit branches, respectively,
by numerically solving a system of equations in which:
the measurements of the cross-polarization transfer functions of the respective pairs of the plurality of dual-polarized antenna elements are a function of the coupling values for the respective pairs of the plurality of dual-polarized antenna elements and the reflection coefficient values; and
a subset of the coupling values are set to zero, wherein the subset of the coupling values are those for predetermined pairs of the plurality of dual-polarized antenna elements;
compute correction factors for the plurality of dual-polarized antenna elements based on the coupling values and the reflection coefficient values; and
calculate beam weighting factors for at least a subset of the plurality of dual-polarized antenna elements based on the respective correction factors.

2. The radio system of claim 1 wherein the processing unit is further adapted to transmit or receive, via the antenna system, a signal via the at least a subset of the plurality of dual-polarized antenna elements using the beam weighting factors.

3. The radio system of claim 1 wherein the predetermined pairs of the plurality of dual-polarized antenna elements are those for which coupling is known to be less than a threshold amount of coupling.

4. The radio system of claim 1 wherein:
each antenna element of the plurality of dual-polarized antenna elements has a first input/output connection for a first polarization and a second input/output connection for a second polarization; and
in order to obtain the measurements of the cross-polarization transfer functions between the respective pairs of the plurality of dual-polarized antenna elements, the processing unit is further adapted to, for each pair of the plurality of dual-polarized antenna elements:
obtain a measurement of the cross-polarization transfer function from the first input/output connection of a first antenna element of the pair for the first polarization to the second input/output connection of a second antenna element of the pair for the second polarization; and
obtain a measurement of the cross-polarization transfer function from the second input/output connection of the first antenna element of the pair for the second polarization to the first input/output connection of the second antenna element of the pair for the first polarization.

5. The radio system of claim 4 wherein the system of equations comprises:

a first set of equations that define the measurements of the cross-polarization transfer functions of the respective pairs of the plurality of dual-polarized antenna elements as a function of the coupling values for the respective pairs of the plurality of dual-polarized antenna elements and the reflection coefficient values; and
a second set of equations that set the subset of the coupling values to zero.

6. The radio system of claim 5 wherein the first set of equations define the measurements of the cross-polarization transfer functions of the respective pairs of the plurality of dual-polarized antenna elements as:

$$M_{ik} \approx \left(1 - \sum_{j}^{N; j \neq i} St_{ji} e^{jk(R_j - R_i)_{cal}}\right)\left(Sx_{ik} - \sum_{j}^{j \neq i} \gamma_{t,j} St_{i,j} Sx_{jk} - \sum_{l}^{l \neq k} S x_{il} S r_{kl}\right)$$

where:
$M_{ik}$ is the measurement for the pair of antenna elements consisting of an i-th antenna element as a transmitting antenna element and a k-th antenna element as a receiving antenna element;
N is a total number of antenna elements;
$St_{ij}$ is a co-polarization coupling between the i-th antenna element and j-th antenna element, the j-th antenna element also being a transmitting antenna element using the same polarization as the i-th antenna element;
$St_{ji}$ is a co-polarization coupling between the j-th antenna element and i-th antenna element, the i-th antenna element also being a transmitting antenna element using the same polarization as the j-th antenna element;
$Sr_{kl}$, is a co-polarization coupling between the k-th antenna element and an l-th antenna element, the l-th antenna element also being a receiving antenna element using the same polarization as the k-th antenna element;
$Sx_{ik}$ is a cross-polarization coupling between the i-th antenna element and the k-th antenna element;
$Sx_{jk}$ is a cross-polarization coupling between the j-th antenna element and the k-th antenna element;
$Sx_{il}$ is a cross-polarization coupling between the i-th antenna element and the l-th antenna element;
$Y_{t,j}$ is the reflection coefficient value for a power amplifier of the transmit branch coupled to the j-th antenna element;
e is Euler's number and wherein j=√−1 in $e^{jk}$ and $$k = \frac{2\pi}{\lambda}$$

is a wave factor with λ as a wave length of a frequency of operation of the radio system; and
$(R_j - R_i)_{cal}$ is a difference between: (a) a distance $(R_j)$ from the j-th antenna element to a receiver during initial calibration of the antenna elements and (b) a distance $(R_i)$ and from the i-th antenna element to the receiver.

7. The radio system of claim 5 wherein the first set of equations define the measurements of the cross-polarization transfer functions of the respective pairs of the plurality of dual-polarized antenna elements as:

$$M_{ik} \approx \left(1 - \sum_{j}^{N; j \neq i} St_{ji}\right)\left(Sx_{ik} - \sum_{j}^{j \neq i} \gamma_{tj} St_{ij} Sx_{jk} - \sum_{l}^{l \neq k} Sx_{il} Sr_{kl}\right)$$

where:
- $M_{ik}$ is the measurement for the pair of antenna elements consisting of an i-th antenna element as a transmitting antenna element and a k-th antenna element as a receiving antenna element;
- N is a total number of antenna elements;
- $St_{ij}$ is a co-polarization coupling between the i-th antenna element and j-th antenna element, the j-th antenna element also being a transmitting antenna element using the same polarization as the i-th antenna element;
- $St_{ji}$ is a co-polarization coupling between the j-th antenna element and i-th antenna element, the i-th antenna element also being a transmitting antenna element using the same polarization as the j-th antenna element;
- $Sr_{kl}$, is a co-polarization coupling between the k-th antenna element and an l-th antenna element, the l-th antenna element also being a receiving antenna element using the same polarization as the k-th antenna element;
- $Sx_{ik}$ is a cross-polarization coupling between the i-th antenna element and the k-th antenna element;
- $Sx_{jk}$ is a cross-polarization coupling between the j-th antenna element and the k-th antenna element;
- $Sx_{il}$ is a cross-polarization coupling between the i-th antenna element and the l-th antenna element;
- $Y_{tj}$ is the reflection coefficient value for a power amplifier of the transmit branch coupled to the j-th antenna element;

$$k = \frac{2\pi}{\lambda}$$

is a wave factor with λ as a wave length of a frequency of operation of the radio system.

8. The radio system of claim 1 wherein the processing unit is further adapted to:
   update the reflection coefficient values; and
   update the correction factors based on the updated reflection coefficient values.

9. The radio system of claim 8 wherein, in order to update the reflection coefficient values, the processing unit is further adapted to:
   for each antenna element of the plurality of dual-polarized antenna elements for each beam direction of a plurality of beam directions, obtain a beam-based measurement of a ratio of a transmitted signal transmitted via at least a subset of the plurality of dual-polarized antenna elements at the beam direction and a respective captured signal received via the antenna element; and
   compute the updated reflection coefficient values based on the beam-based measurements.

10. A method in a radio system comprising an antenna system comprising a plurality of dual-polarized antenna elements, a plurality of transmit branches coupled to the plurality of dual-polarized antenna elements, respectively, and a plurality of receive branches coupled to the plurality of dual-polarized antenna elements, respectively, the method comprising:
    obtaining measurements of cross-polarization transfer functions between respective pairs of the plurality of dual-polarized antenna elements;
    computing:
      coupling values for the respective pairs of the plurality of dual-polarized antenna elements, and
      reflection coefficient values for a plurality of power amplifiers in the plurality of transmit branches, respectively,
    by numerically solving a system of equations in which:
      the measurements of the cross-polarization transfer functions of the respective pairs of the plurality of dual-polarized antenna elements are a function of the coupling values for the respective pairs of the plurality of dual-polarized antenna elements and the reflection coefficient values; and
      a subset of the coupling values are set to zero, wherein the subset of the coupling values are those for predetermined pairs of the plurality of dual-polarized antenna elements;
    computing correction factors for the plurality of dual-polarized antenna elements based on the coupling values and the reflection coefficient values; and
    calculating beam weighting factors for at least a subset of the plurality of dual-polarized antenna elements based on the respective correction factors.

11. The method of claim 10 further comprising transmitting or receiving, via the antenna system, a signal via the at least a subset of the plurality of dual-polarized antenna elements using the beam weighting factors.

12. The method of claim 10 wherein the predetermined pairs of the plurality of dual-polarized antenna elements are those for which coupling is known to be less than a threshold amount of coupling.

13. The method of claim 10 wherein:
    each antenna element of the plurality of dual-polarized antenna elements has a first input/output connection for a first polarization and a second input/output connection for a second polarization; and
    obtaining the measurements of the cross-polarization transfer functions between the respective pairs of the plurality of dual-polarized antenna elements comprises, for each pair of the plurality of dual-polarized antenna elements:
      obtaining a measurement of the cross-polarization transfer function from the first input/output connection of a first antenna element of the pair for the first polarization to the second input/output connection of a second antenna element of the pair for the second polarization; and
      obtaining a measurement of the cross-polarization transfer function from the second input/output connection of the first antenna element of the pair for the second polarization to the first input/output connection of the second antenna element of the pair for the first polarization.

14. The method of claim 13 wherein the system of equations comprises:
    a first set of equations that define the measurements of the cross-polarization transfer functions of the respective pairs of the plurality of dual-polarized antenna elements as a function of the coupling values for the respective pairs of the plurality of dual-polarized antenna elements and the reflection coefficient values; and
    a second set of equations that set the subset of the coupling values to zero.

15. The method of claim 14 wherein the first set of equations define the measurements of the cross-polarization transfer functions of the respective pairs of the plurality of dual-polarized antenna elements as:

$$M_{ik} \approx \left(1 - \sum_{j}^{N; j \neq i} St_{ji} e^{jk(R_j - R_i)_{cal}}\right)\left(Sx_{ik} - \sum_{j}^{j \neq i} \gamma_{t,j} St_{i,j} Sx_{jk} - \sum_{l}^{l \neq k} S_{x_{il}} Sr_{kl}\right)$$

where:
- $M_{ik}$ is the measurement for the pair of antenna elements consisting of an i-th antenna element as a transmitting antenna element and a k-th antenna element as a receiving antenna element;
- N is a total number of antenna elements;
- $St_{ij}$ is a co-polarization coupling between the i-th antenna element and j-th antenna element, the j-th antenna element also being a transmitting antenna element using the same polarization as the i-th antenna element;
- $St_{ji}$ is a co-polarization coupling between the j-th antenna element and i-th antenna element, the i-th antenna element also being a transmitting antenna element using the same polarization as the j-th antenna element;
- $Sr_{kl}$, is a co-polarization coupling between the k-th antenna element and an l-th antenna element, the l-th antenna element also being a receiving antenna element using the same polarization as the k-th antenna element;
- $Sx_{ik}$ is a cross-polarization coupling between the i-th antenna element and the k-th antenna element;
- $Sx_{jk}$ is a cross-polarization coupling between the j-th antenna element and the k-th antenna element;
- $Sx_{il}$ is a cross-polarization coupling between the i-th antenna element and the l-th antenna element;
- $Y_{tj}$ is the reflection coefficient value for a power amplifier of the transmit branch coupled to the j-th antenna element;
- e is Euler's number and wherein $j=\sqrt{-1}$ in $e^{jk}$ and $$k = \frac{2\pi}{\lambda}$$

is a wave factor with λ as a wave length of a frequency of operation of the radio system; and
- $(R_j - R_i)_{cal}$ is a difference between: (a) a distance ($R_j$) from the j-th antenna element to a receiver during initial calibration of the antenna elements and (b) a distance ($R_i$) and from the i-th antenna element to the receiver.

16. The method of claim 14 wherein the first set of equations define the measurements of the cross-polarization transfer functions of the respective pairs of the plurality of dual-polarized antenna elements as:

$$M_{ik} \approx \left(1 - \sum_{j}^{N; j \neq i} St_{ji}\right)\left(Sx_{ik} - \sum_{j}^{j \neq i} \gamma_{t,j} St_{i,j} Sx_{jk} - \sum_{l}^{l \neq k} S_{x_{il}} Sr_{kl}\right)$$

where:
- $M_{ik}$ is the measurement for the pair of antenna elements consisting of an i-th antenna element as a transmitting antenna element and a k-th antenna element as a receiving antenna element;
- N is a total number of antenna elements;
- $St_{ij}$ is a co-polarization coupling between the i-th antenna element and j-th antenna element, the j-th antenna element also being a transmitting antenna element using the same polarization as the i-th antenna element;
- $St_{ji}$ is a co-polarization coupling between the j-th antenna element and i-th antenna element, the i-th antenna element also being a transmitting antenna element using the same polarization as the j-th antenna element;
- $Sr_{kl}$, is a co-polarization coupling between the k-th antenna element and an l-th antenna element, the l-th antenna element also being a receiving antenna element using the same polarization as the k-th antenna element;
- $Sx_{ik}$ is a cross-polarization coupling between the i-th antenna element and the k-th antenna element;
- $Sx_{jk}$ is a cross-polarization coupling between the j-th antenna element and the k-th antenna element;
- $Sx_{il}$ is a cross-polarization coupling between the i-th antenna element and the l-th antenna element;
- $Y_{tj}$ is the reflection coefficient value for a power amplifier of the transmit branch coupled to the j-th antenna element.

17. The method of claim 10 further comprising:
updating the reflection coefficient values; and
updating the correction factors based on the updated reflection coefficient values.

18. The method of claim 17 wherein updating the reflection coefficient values comprises:
for each antenna element of the plurality of dual-polarized antenna elements for each beam direction of a plurality of beam directions, obtaining a beam-based measurement of a ratio of a transmitted signal transmitted via at least a subset of the plurality of dual-polarized antenna elements at the beam direction and a respective captured signal received via the antenna element; and
computing the updated reflection coefficient values based on the beam-based measurements.

* * * * *